United States Patent
Lee et al.

(10) Patent No.: US 10,048,833 B2
(45) Date of Patent: Aug. 14, 2018

(54) MOBILE TERMINAL PROVIDING AN IMPROVED MEMO FUNCTION FOR VARIOUS SEPARATE APPLICATIONS AND METHOD FOR CONTROLLING THE SAME

(71) Applicant: LG ELECTRONICS INC., Seoul (KR)

(72) Inventors: Bongjun Lee, Seoul (KR); Changyong Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 351 days.

(21) Appl. No.: 14/447,506

(22) Filed: Jul. 30, 2014

(65) Prior Publication Data

US 2015/0143275 A1    May 21, 2015

(30) Foreign Application Priority Data

Nov. 21, 2013  (KR) .................. 10-2013-0142368

(51) Int. Cl.

| | |
|---|---|
| G06F 3/048 | (2013.01) |
| G06F 3/0482 | (2013.01) |
| G06F 3/0481 | (2013.01) |
| G06F 3/0488 | (2013.01) |
| G06F 3/0484 | (2013.01) |
| H04M 1/725 | (2006.01) |

(52) U.S. Cl.
CPC .......... *G06F 3/0482* (2013.01); *G06F 3/0484* (2013.01); *G06F 3/0488* (2013.01); *G06F 3/04817* (2013.01); *H04M 1/72522* (2013.01); *H04M 2250/22* (2013.01)

(58) Field of Classification Search
CPC ........ G06F 8/34; G06F 17/2247; G06F 3/017; G05B 19/0426; G05B 2219/23258; G06Q 10/10
USPC ........................................ 715/771, 230, 863
See application file for complete search history.

(56) References Cited

U.S. PATENT DOCUMENTS

| | | | | |
|---|---|---|---|---|
| 2006/0085767 | A1* | 4/2006 | Hinckley ............. | G06F 3/04883 715/863 |
| 2012/0127082 | A1* | 5/2012 | Kushler .............. | G06F 3/04886 345/169 |
| 2013/0086056 | A1* | 4/2013 | Dyor ....................... | G06F 3/167 707/730 |
| 2014/0075393 | A1* | 3/2014 | Mei ................... | G06F 17/30967 715/863 |

* cited by examiner

*Primary Examiner* — Joy M Weber
(74) *Attorney, Agent, or Firm* — Lee, Hong, Degerman, Kang & Waimey PC

(57) ABSTRACT

A mobile terminal and a method of controlling therefor are disclosed. The method includes activating a memo mode while displaying a screen of a first application; displaying a first touch pattern in response to a first pattern input including the first pattern; displaying a plurality of primary graphic user interface (GUI) items respectively corresponding to a plurality of primary content items associated with the first touch pattern; and displaying content associated with a primary content item corresponding to a selected primary GUI item, wherein the selected primary GUI item is selected from among the displayed plurality of primary GUI items in response to an input, and wherein the displaying of the content is at a position proximate to the displayed first pattern.

17 Claims, 35 Drawing Sheets

FIG. 4
| specific pattern | recommended word |
|---|---|
|  | come here, look here, where is here?, is it here?, look around |
| 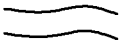 | important!!, memorize!, this is the number~, that's it!! |
|  | memorize, important!!, exactly here |

FIG. 8
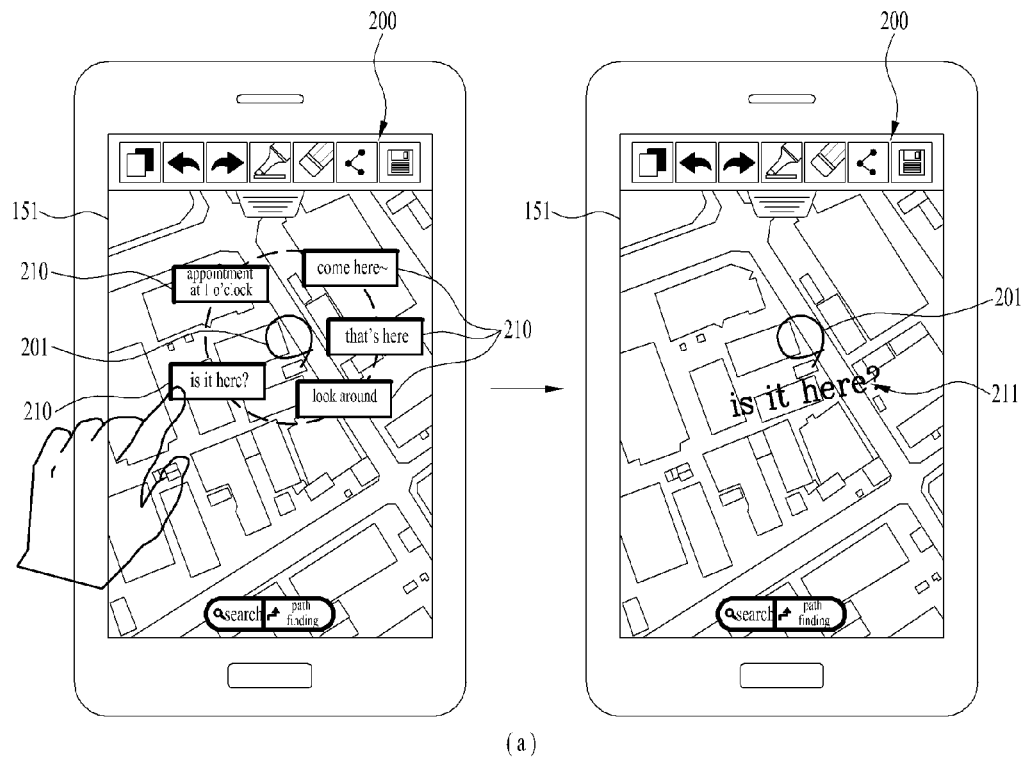
(a)
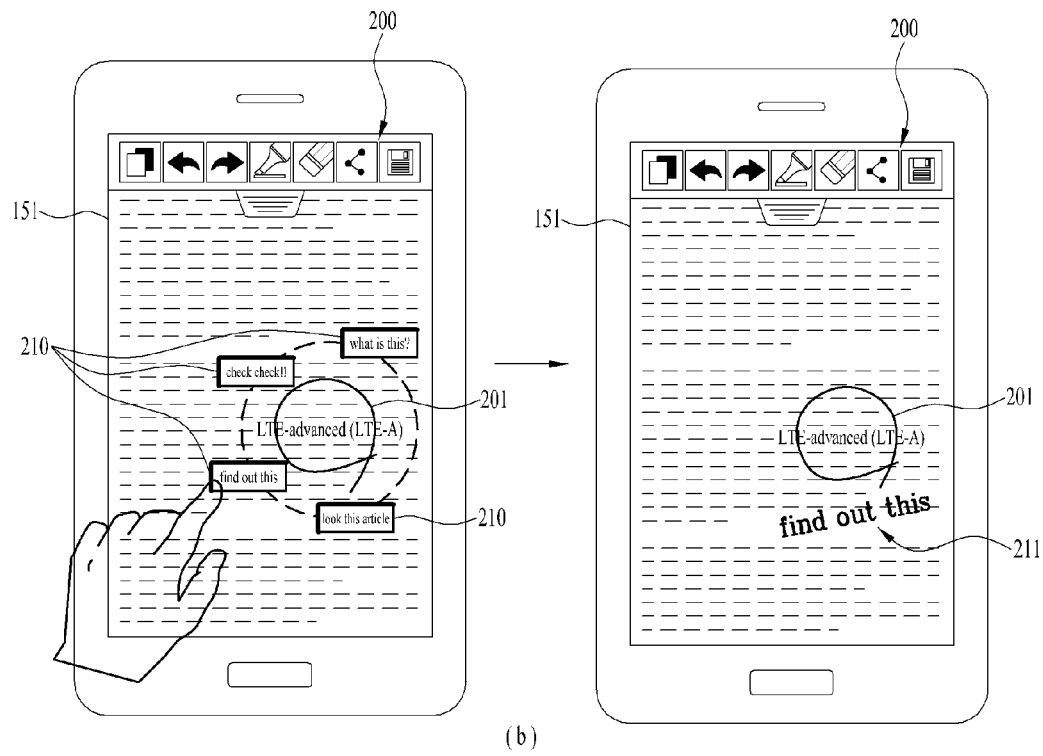
(b)

FIG. 9
| specific pattern | application | recommend word |
|---|---|---|
|  | map | come here, look here, where is here? |
| | web service | look this site, look this |
| 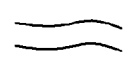 | web service | important!!, memorize!, that's it!! |
| | contact | call, this is the number~, memorize |
|  | web service | Memorize, important!!, exactly here |
| | map | important!!, exactly here!, here!! |

(a)          (b)

MOBILE TERMINAL PROVIDING AN IMPROVED MEMO FUNCTION FOR VARIOUS SEPARATE APPLICATIONS AND METHOD FOR CONTROLLING THE SAME

Pursuant to 35 U.S.C. § 119(a), this application claims the benefit of earlier filing date and right of priority to Korean Application No. 10-2013-0142368, filed on Nov. 21, 2013, the contents of which are hereby incorporated by reference herein in their entirety.

BACKGROUND OF THE INVENTION

Field of the Invention

The present invention relates to a mobile terminal and an apparatus therefor enabling a user to more conveniently use the mobile terminal.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, a mobile terminal equipped with a simple memo function is introduced to enable a user to write a memo by directly drawing a pattern on an execution screen while a specific application is executing. Yet, if a screen of a mobile terminal is small, it is not easy for a user to write a memo on the screen. Moreover, in case that a user intends to repeatedly write a memo for standardized content, it is not convenient for the user to directly write down the standardized content every time.

SUMMARY OF THE INVENTION

Accordingly, the present invention is directed to an apparatus and method thereof that substantially obviate one or more problems due to limitations and disadvantages of the related art.

One technical task, which is intended to achieve by one embodiment of the present invention, is to provide a mobile terminal displaying a recommended word corresponding to a specific pattern and automatically completing a memo when a user selects a preferred recommended word.

Another technical task, which is intended to achieve by one embodiment of the present invention, is to provide a mobile terminal automatically completing a memo in a manner of adding additional information to a recommended word selected by a user.

The other technical task, which is intended to achieve by one embodiment of the present invention, is to provide a mobile terminal automatically setting an application capable of being interlocked with the mobile terminal using information included in the memo.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of controlling a mobile terminal includes the steps of activating a memo mode while a first application is executing, receiving a first touch input of a specific pattern in the memo mode, displaying first GUIs respectively corresponding to at least two recommended words, which correspond to the specific pattern, and a trajectory of the specific pattern in a display, receiving a second touch input for selecting one of the displayed first GUIs, and displaying a recommended word corresponding to the selected first GUI in the vicinity of the trajectory of the specific pattern.

To further achieve these objects and other advantages and in accordance with the purpose of the invention, as embodied and broadly described herein, according to a different embodiment, a method of controlling a mobile terminal includes the steps of activating a memo mode while a first application is executing, receiving a first touch input corresponding to a part of an execution screen of the first application in the memo mode, receiving a second touch input of a specific pattern, displaying GUIs, which correspond to at least one second application capable of interlocking with the specific pattern, in a display, receiving a third touch input for selecting one of the displayed GUIs, executing a second application corresponding to the selected GUI, and displaying an indicator indicating an execution result of the second application in the display.

According to one embodiment, a mobile terminal includes a user input unit configured to receive a first touch input of a specific pattern in the memo mode, a display configured to display first GUIs respectively corresponding to at least two recommended words, which correspond to the specific pattern, and a trajectory of the specific pattern, and a controller, the controller configured to control the user input unit to receive a second touch input for selecting one of the displayed first GUIs, the controller configured to control the display to display a recommended word corresponding to the selected first GUI in the vicinity of the trajectory of the specific pattern.

It is to be understood that both the foregoing general description and the following detailed description of the present invention are exemplary and explanatory and are intended to provide further explanation of the invention as claimed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIG. 4 is a diagram for an example of a database stored in a memory of a mobile terminal according to one embodiment of the present invention;

FIG. 8 is a diagram for a screen of a display of a mobile terminal according to one embodiment of the present invention;

FIG. 9 is a diagram for an example of a database stored in a memory of a mobile terminal according to one embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
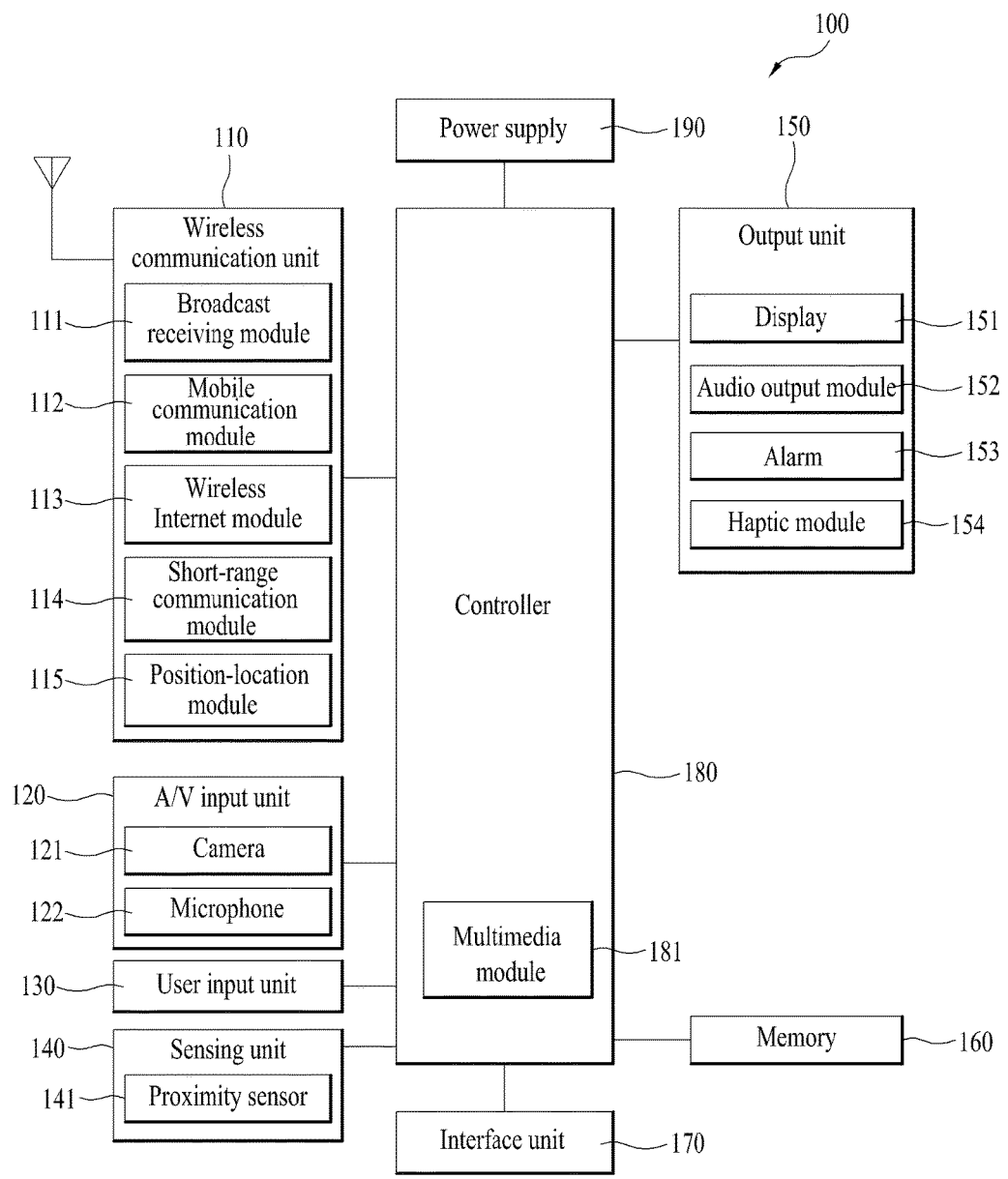
FIG. 1 is a block diagram of a mobile terminal in accordance with an embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
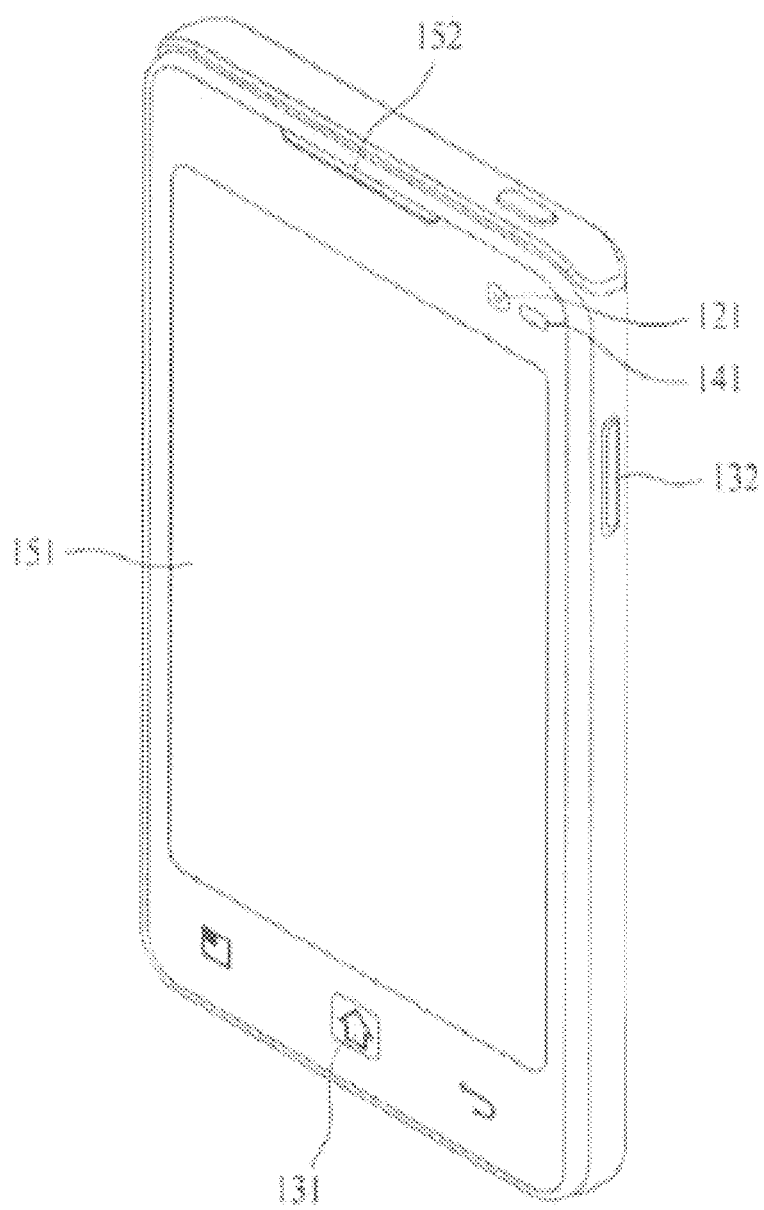
FIG. 2A is a front perspective diagram of a mobile terminal according to the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 (For example, see FIG. 2B) and a rear case 102 (For example, see FIG. 2B). Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122 (For example, see FIG. 2B), an interface unit 170 (For example, see FIG. 2B) and the like can be provided to the terminal body, and more particularly, to the front case 101.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface unit 170 (For example, see FIG. 2B) can be provided to lateral sides of the front and rear cases 101 and 102 (For example, see FIG. 2B).

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
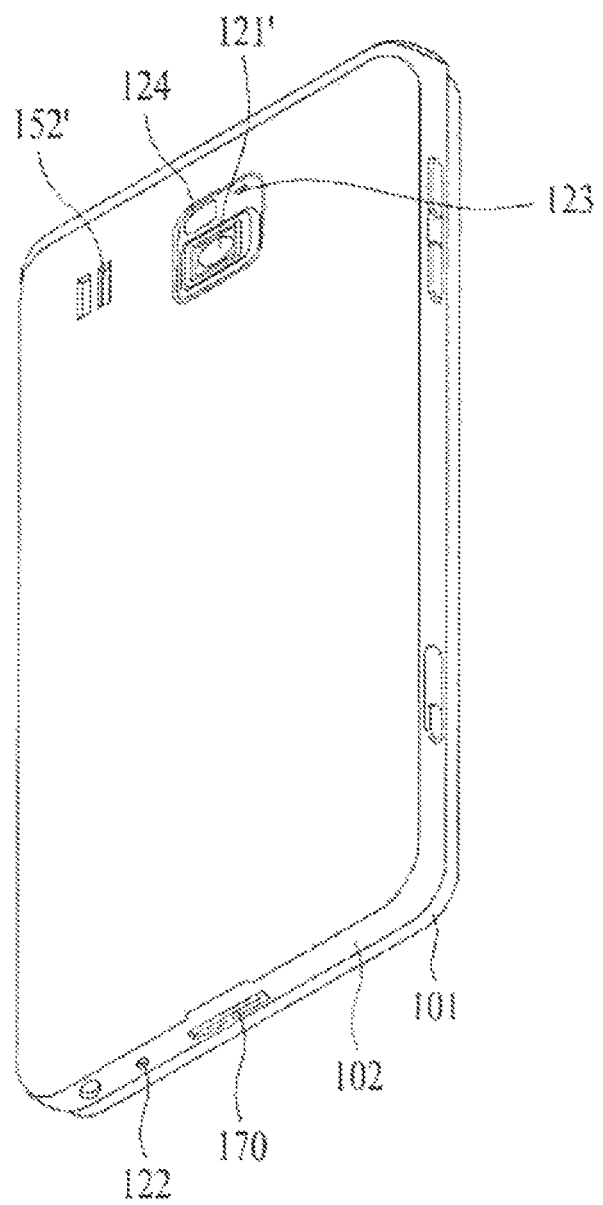
FIG. 2B is a perspective diagram of a backside of the mobile terminal shown in FIG. 2A.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad for detecting a touch can be additionally provided to the rear case 102. The touchpad can be configured in a light transmittive type like the display 151. In this case, if the display 151 is configured to output visual information from its both faces, it is able to recognize the visual information via the touchpad as well. The information outputted from both of the faces can be entirely controlled by the touchpad. Alternatively, a display is further provided to the touchpad so that a touchscreen can be provided to the rear case 102 as well.

The touchpad is activated by interconnecting with the display 151 of the front case 101. The touchpad can be provided in rear of the display 151 in parallel. The touchpad can have a size equal to or smaller than that of the display 151.

In the following description, a method of controlling a mobile terminal 100 and associated embodiments implementable in the mobile terminal are explained with reference to attached drawings.

For clarity, assume that the mobile terminal 100 mentioned in the following includes at least one of the components shown in FIG. 1. Specifically, the mobile terminal 100 according to the present invention can include a user input unit 130, a display 151, a memory 160, and a controller 180. In some cases, the mobile terminal 100 according to the present invention may further include a proximity sensor 141 (See also FIG. 2A). Since the present invention can be more easily implemented in case that the display 151 is implemented by a touchscreen 151, the present invention is explained in an assumption that the display 151 corresponds to the touchscreen 151 in the following description. In case that the user input unit 130 is configured in a manner of including a touch sensor 137, the touchscreen 151 may also be used as the user input unit 130.

According to embodiment, the mobile terminal 100 may become a transmitting terminal or a receiving terminal in the present invention.

Configuration modules of the mobile terminal 100 are explained in the following in relation to embodiment of the present invention. The present specification is explained in an assumption that a memo mode is activated while a specific application is executing in the mobile terminal 100. The memo mode indicates a mode capable of directly writing a memo of a prescribed content on an execution screen of the specific application. For clarity, the specific application is named a first application in the following description.

The user input unit 130 receives a first touch input of a specific pattern in the memo mode. The display 151 includes a touch screen. If a touch input is received via the touch screen, the touch screen plays a role of the user input unit 130.

The display 151 displays a trajectory of a first GUI and the trajectory of the specific pattern corresponding to one or more recommended words, respectively. The trajectory corresponds to a concept including a figure, a shape of an irregular form, a sign, a closed curve, and the like.

If the first touch is detected, the controller 180 configures GUIs respectively including a plurality of recommended words corresponding to the specific pattern and displays the GUIs via the display 151.

The trajectory of the specific pattern and a first GUI are displayed in an execution screen of the first application in a manner of overlaying the execution screen of the first application. The execution screen of the first application may correspond to a screen displayed in the display 151 in a state that the memo mode is activated while the first application is executing. For instance, a screen corresponding to the memo mode can be displayed in a captured image of the execution screen of the first application in a manner of overlaying the captured image. Or, the screen corresponding to the memo mode can be displayed in consecutive execution screens of the first application in a manner of overlaying the execution screens. The memory 160 stores mapping data between the specific pattern and a recommended word. Pluralities of recommended words are mapped to the specific pattern.

According to embodiment, the controller 180 may output the first GUI only, which corresponds to each of the recommended words associated with the first application, among a plurality of the recommended words stored in the memory in a manner of being mapped to the specific pattern via the display 151. In this case, the memory 160 may store the specific pattern and mapping data between a recommended word and a specific application.

And, according to embodiment, the recommended word associated with the first application may relate to information corresponding to a position in the display 151 in which a trajectory of the specific pattern is displayed among the information associated with the first application.

The user input unit 130 receives a second touch input for selecting one of the first GUIs displayed in the display 151.

The display 151 displays a recommended word corresponding to the selected first GUI. If a second touch input is detected, the controller 180 controls the display 151 to display the recommended word, which is selected by the second touch input and corresponds to the first GUI, in the vicinity of the trajectory of the specific pattern.

According to embodiment, the controller 180 can control the display 151 to display second GUIs corresponding to each of informations, which correspond to positions in the display 151 in which the trajectory of the specific pattern is displayed, among the informations associated with the first application.

In a state that the second GUIs are displayed in the display 151, the user input unit 130 receives a third touch input for selecting at least one of the second GUIs.

The display 151 displays information corresponding to the selected second GUI. If the third touch input is detected, the controller 180 controls the display 151 to display information corresponding to the second GUI which is selected by the third touch input. The information corresponding to the selected second GUI can be displayed in one screen of the display 151 together with the specific pattern and the recommended word corresponding to the selected first GUI.

According to embodiment, the controller 180 can display at least one icon via the display 151. The at least one icon respectively corresponds to a second application and is capable of being interlocked with a specific keyword included in the recommended word displayed in the display 151.

In a state that the icons are displayed in the display 151, the user input unit 130 receives a fourth touch input for selecting one of the icons.

If the fourth touch input is detected, the controller 180 executes the second application corresponding to the selected icon and can configure the executed second application using information, which corresponds to a position in the display 151 in which a trajectory of the specific pattern is displayed, among the information associated with the first application.

The controller 180 controls the display 151 to display the icon corresponding to the second application in an inactivated state before the second application is configured. If the configuration of the second application is completed, the controller can control the display 151 to display the icon corresponding to the second application as an active state.

In the following description, embodiments of the present invention are explained in detail with reference to each of the attached drawings.

Figure 3:
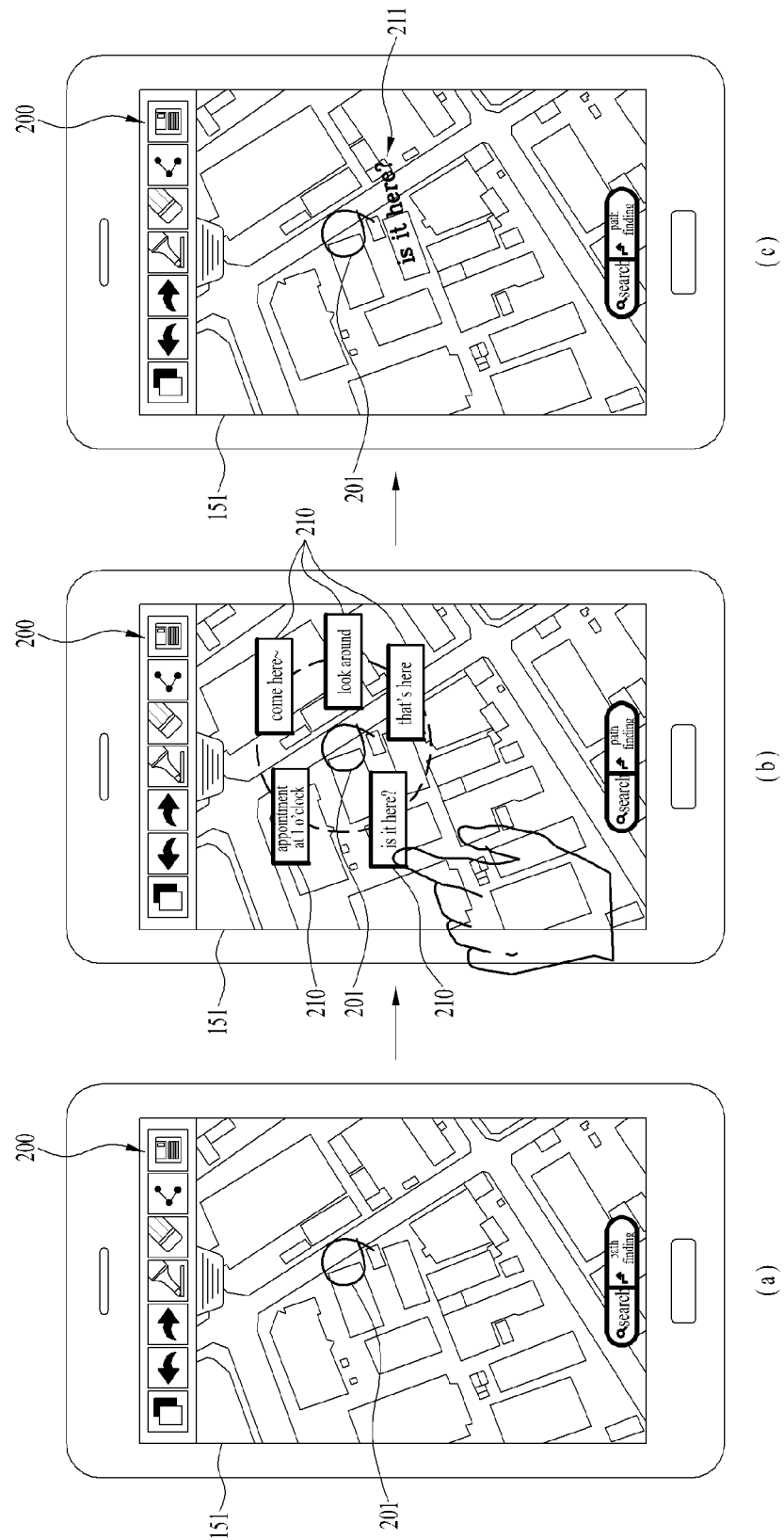
FIG. 3 is a diagram for a screen of a display of a mobile terminal according to one embodiment of the present invention.

FIG. 3 is a diagram for a screen of a display of a mobile terminal according to one embodiment of the present invention.

The mobile terminal 100 is in a state that a memo mode is activated while a first application is executing. Referring to FIG. 3, the first application corresponds to a map application for example. If the memo mode is activated, a menu bar 200 capable of editing a memo function can be displayed in the display 151.

As depicted in FIG. 3 (*a*), the user input unit 130 receives a first touch input of a specific pattern in the memo mode. The controller 180 displays a trajectory 201 of the specific pattern via the display 151.

As depicted in FIG. 3 (*b*), the controller 180 controls the display 151 to display first GUIs 210 respectively corresponding to at least two recommended words, which correspond to the specific pattern. The recommended word is used as a meaning including such a form as a word, a clause, or a sentence. The trajectory 201 of the specific pattern and the first GUI 210 are displayed in an execution screen of the first application in a manner of overlaying the execution screen of the first application.

The memory 160 stores mapping data between the specific pattern and the recommended word.

FIG. 4 is a diagram for an example of a database stored in a memory of a mobile terminal according to one embodiment of the present invention.

Referring to FIG. 4, the memory 160 of the mobile terminal 100 stores specific patterns and database of a plurality of recommended words corresponding to each of the specific patterns. Each of the specific patterns and each of the recommended words can be edited (deletion or addition) by a user.

Meanwhile, although patterns are identical to each other, the patterns may correspond to recommended words different from each other according to a type of an application. The memory 160 may store the aforementioned state. Regarding this, it shall be described later with reference to FIG. 8 and FIG. 9.

Referring back to FIG. 3, the user input unit 130 receives a second touch input for selecting one of the first GUIs 210. According to embodiment, a user may select a plurality of recommended words. In particular, the user input unit 130 may receive a touch input for selecting two or more first GUIs 210.

As depicted in FIG. 3 (c), if the second touch input is detected, the controller 180 controls the display 151 to display a recommended word 211 corresponding to the selected first GUI 210 in the vicinity of the trajectory 201 of the specific pattern.

If a user touches the first GUI 210 corresponding to a recommended word 'is it here?', the recommended word 211 'is it here?' corresponding to the touched first GUI 210 is displayed in the display 151. As an example, the recommended word 211 displayed in the display 151 by a selection of the user can be displayed in a graphic image form or a text form. According to embodiment, the recommended word 211 displayed in the display 151 by the selection of the user can also be displayed in an image form, which is stored in the memory 160 in a manner of handwriting a pattern of the recommended word 211 on the display 151 in a recommended word editing process described in FIG. 10.

According to the present embodiment, since a memo is conveniently completed by drawing a pre-arranged specific pattern instead of directly drawing a phrase corresponding to memo content by a hand of a user, user convenience can be emphasized.

The recommended word 211 displayed in the display 151 by the selection of the user can be adjusted in size or in tilt. Regarding this, it is explained with reference to FIG. 5 to FIG. 7.

Figure 5:
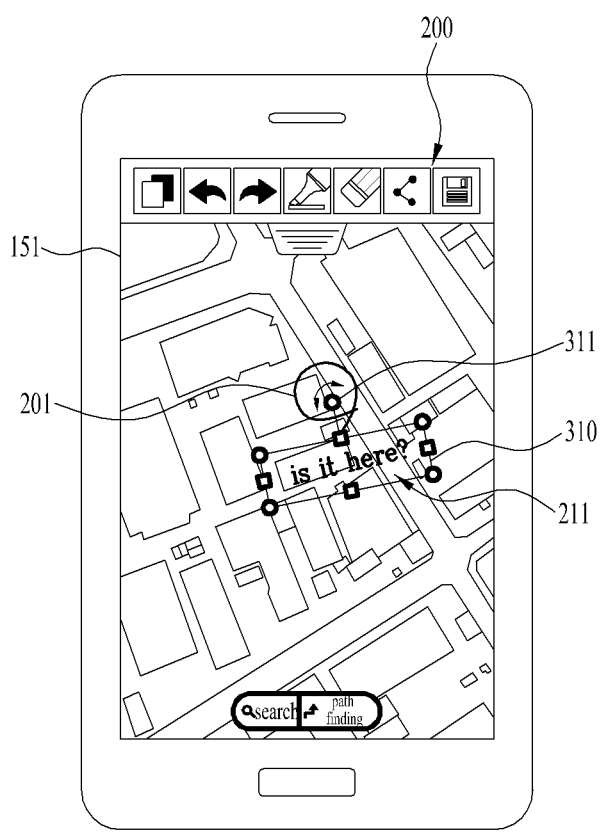
FIG. 5 is a diagram for an example of a method of controlling a display state of a recommended word displayed in a display of a mobile terminal according to one embodiment of the present invention.

FIG. 5 is a diagram for an example of a method of controlling a display state of a recommended word displayed in a display of a mobile terminal according to one embodiment of the present invention.

Referring to FIG. 5, a trajectory 201 of a specific pattern is displayed in the display 151 of the mobile terminal 100 along with a recommended word 211 selected by a user. The recommended word 211 can be displayed in a screen of the display 151 in a manner that a position of the recommended word is changed on the screen. Or, the recommended word can be displayed in the screen of the display 151 in a manner that a size and/or a tilt of the recommended word are changed on the screen.

If the user lightly touches an area on the screen of the display 151 corresponding to the recommended word 211 or touches the area for more than a prescribed time, a guide indicator 310 can be displayed.

The user can change the position of the recommended word 211 by touching and dragging a random area of the guide indicator 310. And, the user can change the size of the recommended word 211 by randomly touching two areas of the guide indicator 310 and dragging the two areas inside or outside. And, the user can change the tilt of the recommended word 211 by touching and dragging a specific part 311 of the guide indicator 310.

Figure 6:
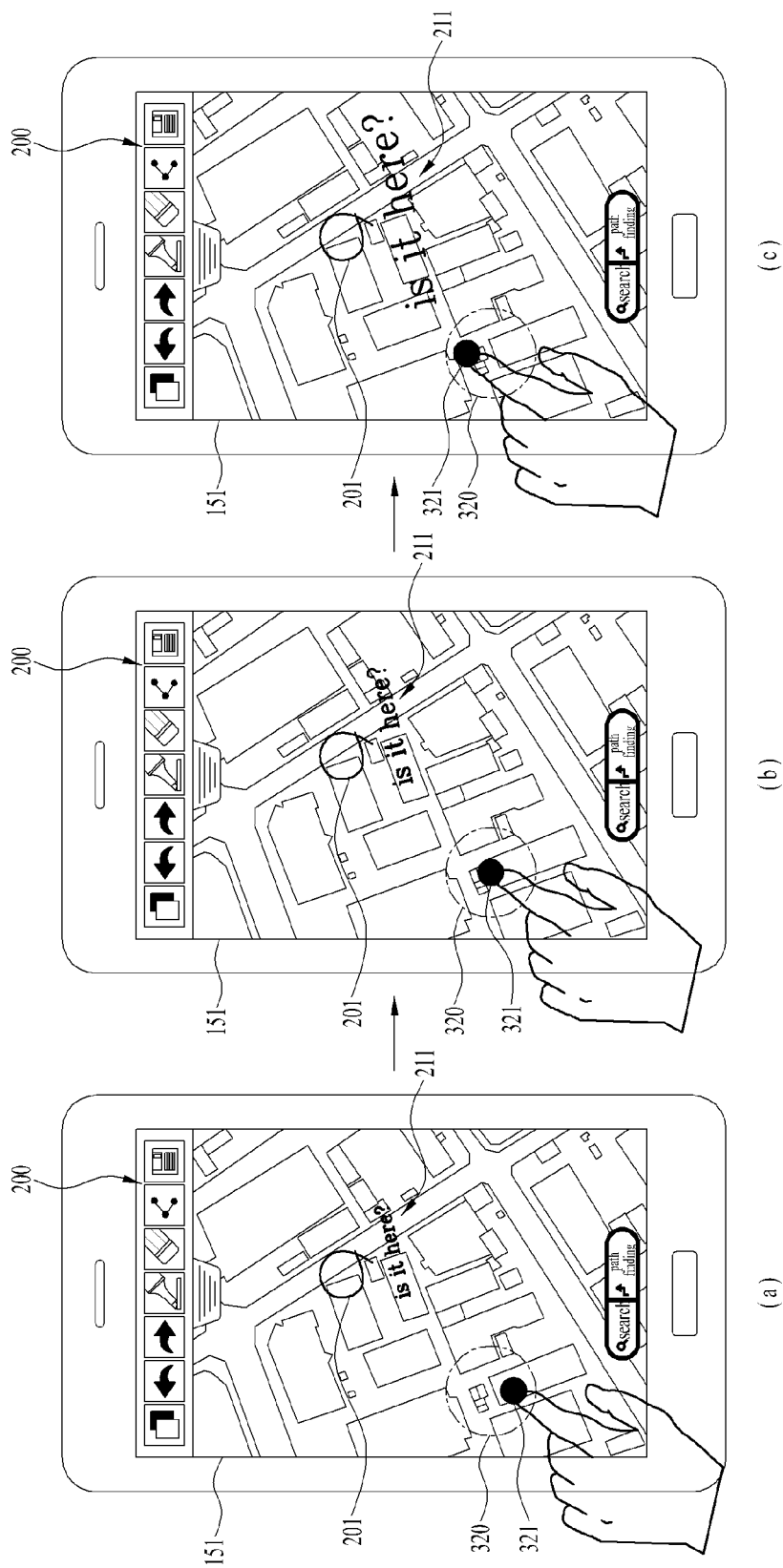
FIG. 6 and FIG. 7 are diagrams for different examples of a method of controlling a display state of a recommended word displayed in a display of a mobile terminal according to one embodiment of the present invention.
Figure 7:
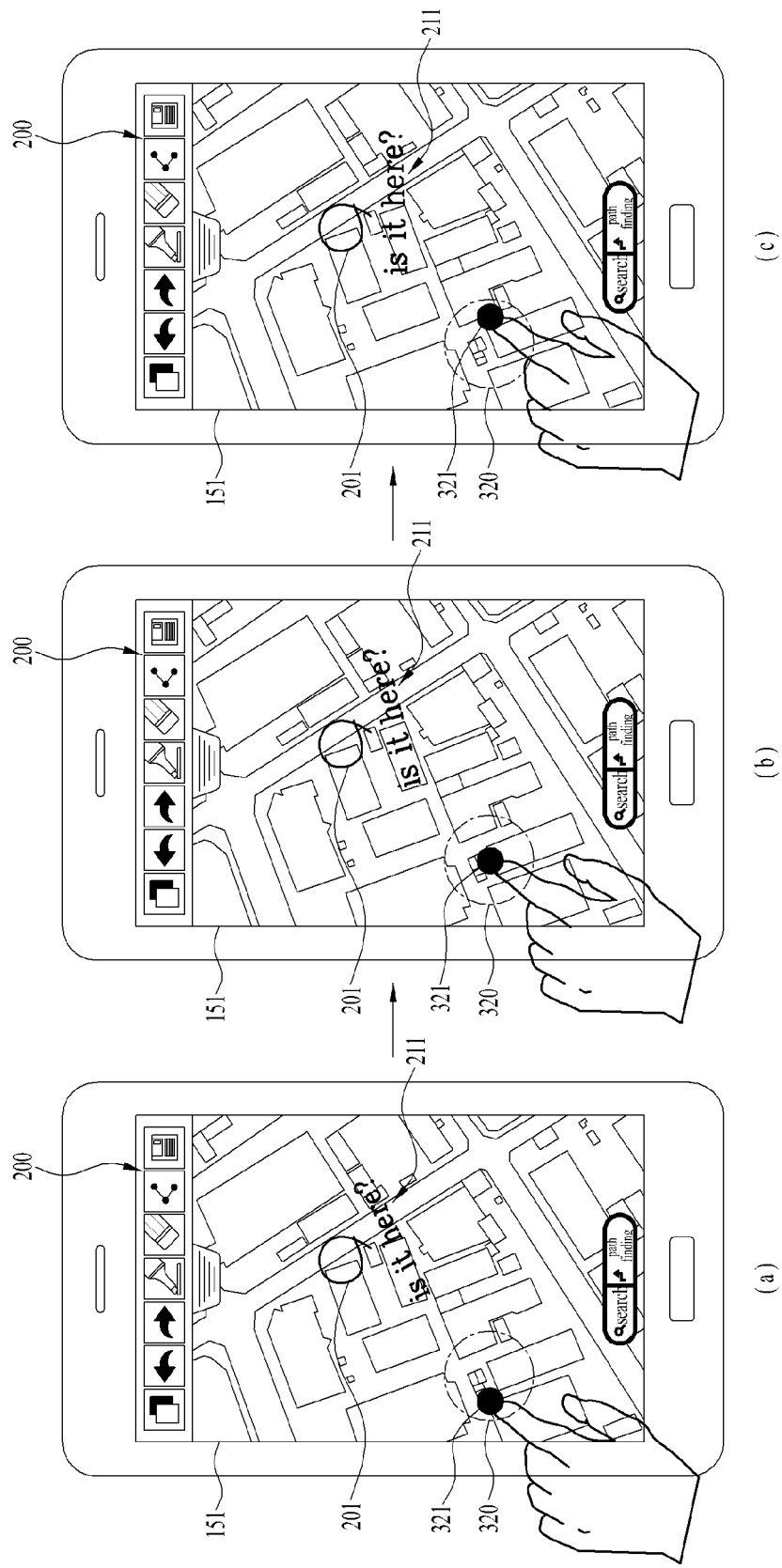

FIG. 6 and FIG. 7 are diagrams for different examples of a method of controlling a display state of a recommended word displayed in a display of a mobile terminal according to one embodiment of the present invention.

If a user lightly touches an area on the screen of the display 151 corresponding to a recommended word 211 or touches the area for more than a prescribed time, a guide indicator 310 can be displayed.

First of all, referring to FIG. 6, if the user touches a guide ball 321 within the guide indicator 320 and drags the guide ball down, the recommended word 211 is displayed in the display 151 in a manner that the recommended word 211 becomes smaller in size (FIG. 6 (a)→(b)). If the user touches the guide ball 321 within the guide indicator 320 and drags the guide ball up, the recommended word 211 can be displayed in the display 151 in a manner that the recommended word 211 becomes bigger in size (FIG. 6 (a)→(c)).

Meanwhile, referring to FIG. 7, if the user touches the guide ball 321 within the guide indicator 320 and drags the guide ball to the left, the recommended word 211 is displayed in the display 151 in a manner that the recommended word 211 is inclined counterclockwise (FIG. 7 (a)→(b)). If the user touches the guide ball 321 within the guide indicator 320 and drags the guide ball to the right, the recommended word 211 is displayed in the display 151 in a manner that the recommended word 211 is inclined clockwise (FIG. 7 (a)→(c)).

Meanwhile, according to the present invention, although a user inputs an identical pattern, a different recommended word may be recommended depending on an application in which a memo mode is activated. Regarding this, it shall be described with reference to FIG. 8 and FIG. 9.

FIG. 8 is a diagram for a screen of a display of a mobile terminal according to one embodiment of the present invention.

The mobile terminal 100 is in a state that a memo mode is activated while a first application is executing. FIG. 8 (a) shows an example that the first application corresponds to a map application and FIG. 8 (b) shows an example that the first application corresponds to a web service application.

The user input unit 130 receives a first touch input of a specific pattern. The controller 180 displays a trajectory 210 of the specific pattern via the display 151.

The controller 180 controls the display 151 to display first GUIs 210, which respectively corresponds to recommended words associated with the first application, among at least two recommended words corresponding to the specific pattern. In particular, although a first touch input corresponding to an identical specific pattern is detected, the controller 180 controls the display 151 to display the first GUIs 210 only, which correspond to each of the recommended words associated with the first application, among a plurality of recommended words corresponding to the specific pattern in accordance with the first application in which the memo mode is executed.

The memory 160 stores specific patterns and mapping data between an application and a recommended word.

FIG. 9 is a diagram for an example of a database stored in a memory of a mobile terminal according to one embodiment of the present invention.

Referring to FIG. 9, the memory 160 of the mobile terminal 100 stores a database in which a plurality of recommended words corresponding to each of specific patterns are stored in a manner of being divided according to an application. Each of the specific patterns and each of a plurality of the recommended words can be edited (deleted or added) by a user according to an application.

Referring back to FIG. 8 (a), among a plurality of recommended words corresponding to a specific pattern, the first GUIs 210 corresponding to each of a plurality of the recommended words associated with a map application are displayed in the display 151. The user input unit 130 receives a second touch input for selecting one of the first GUIs 210. And, if the second touch input is detected, the controller 180 controls the display 151 to display a recommended word 211 corresponding to the selected first GUI 210 in the vicinity of a trajectory 201 of the specific pattern.

Referring to FIG. 8 (b), among a plurality of recommended words corresponding to a specific pattern, the first GUIs 210 corresponding to each of a plurality of the recommended words associated with a web service application are displayed in the display 151. The user input unit 130 receives a second touch input for selecting one of the first GUIs 210. And, if the second touch input is detected, the controller 180 controls the display 151 to display a recommended word 211 corresponding to the selected first GUI 210 in the vicinity of a trajectory 201 of the specific pattern.

In particular, although an identical pattern is inputted, the first GUI 210 of the map application and the first GUI 210 of the web service application include recommended words different from each other.

Meanwhile, according to the present invention, a user may edit a specific pattern and a recommended word corresponding to the specific pattern. Regarding this, it shall be explained with reference to FIG. 10.

Figure 10:
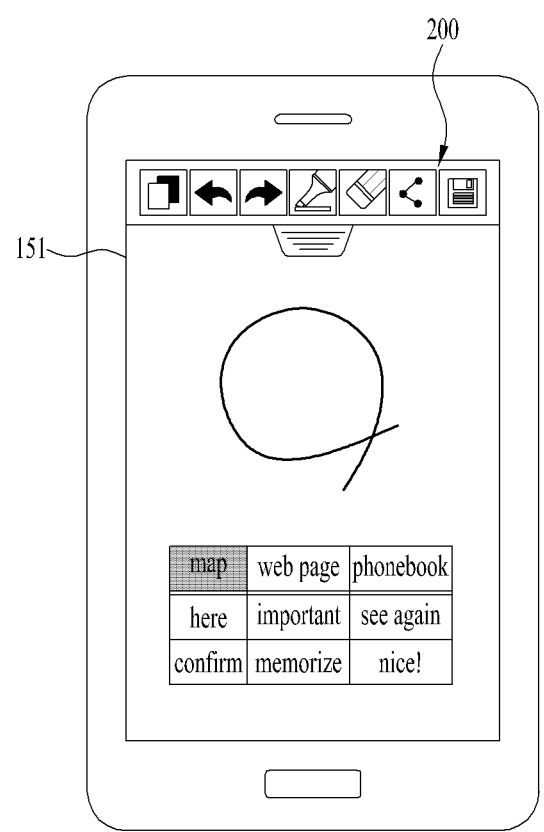
FIG. 10 is a diagram for an example of editing a specific pattern and a recommended word corresponding to the specific pattern in a mobile terminal according to one embodiment of the present invention.

FIG. 10 is a diagram for an example of editing a specific pattern and a recommended word corresponding to the specific pattern in a mobile terminal according to one embodiment of the present invention.

Referring to FIG. 10, it may enter an editing screen of a memo mode via a menu bar 200. A user can add a specific pattern using an editing function of the memo mode or may add a recommended word to a predetermined specific pattern. In this case, the recommended word can be added in a manner of being divided according to an application.

Meanwhile, according to the present invention, a recommended word including information, which corresponds to a position on the display 151 in which a trajectory of a specific pattern is displayed, can be recommended. Regarding this, it shall be explained with reference to FIG. 11 and FIG. 12.

Figure 11:
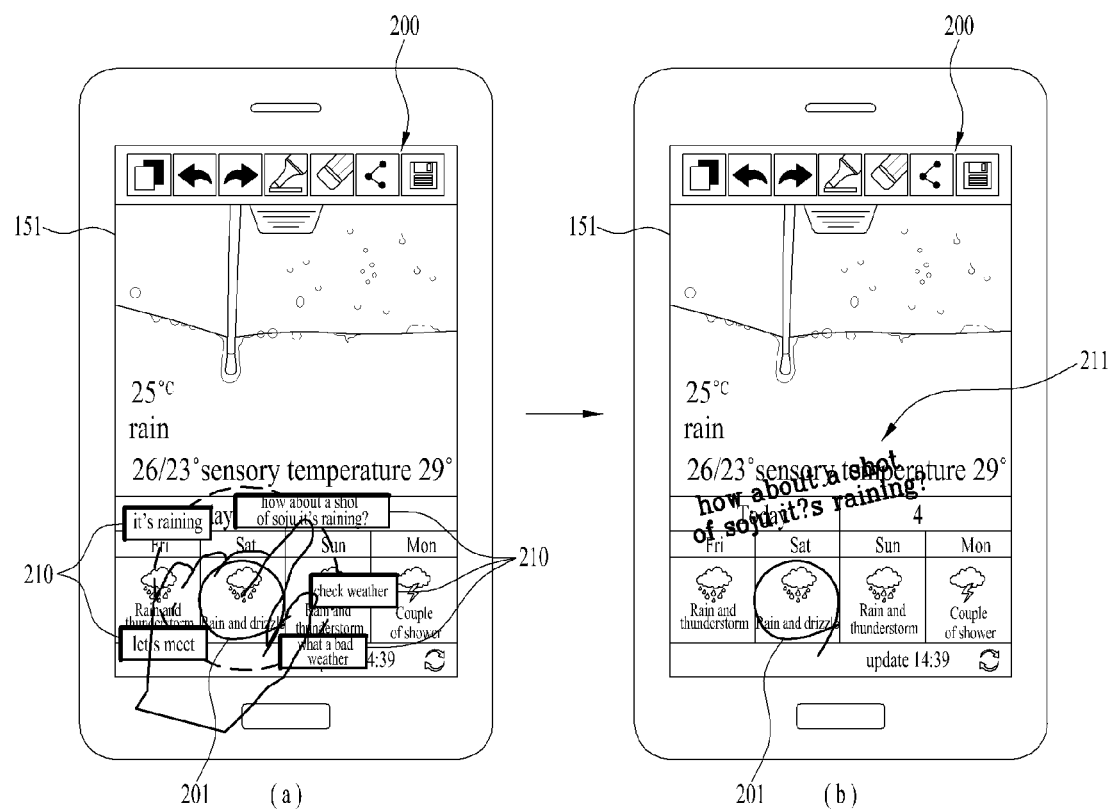
FIG. 11 is a diagram for a screen of a display of a mobile terminal according to one embodiment of the present invention.

FIG. 11 is a diagram for a screen of a display of a mobile terminal according to one embodiment of the present invention.

The mobile terminal 100 is in a state that a memo mode is activated while a first application is executing. FIG. 11 shows an example that the first application corresponds to a weather application.

As depicted in FIG. 11 (a), the user input unit 130 receives a first touch input of a specific pattern in the memo mode. The controller 180 displays a trajectory 201 of the specific pattern via the display 151.

The controller 180 controls the display 151 to display first GUIs 210, which respectively correspond to recommended words associated with the first application among at least two recommended words corresponding to the specific pattern. In this case, at least one of the recommended words corresponding to the first GUIs 210 may be associated with information on a position on the display 151 in which the trajectory of the specific pattern is displayed among information associated with the first application.

The information associated with the first application is information obtainable via the first application. For instance, if the first application corresponds to a weather application, the information may correspond to information on weather, temperature, humidity, day, and the like.

Assume that such a recommended word as 'it's raining', how about a shot of soju it's raining?', 'check weather~', 'let's meet!', 'what a bad weather', 'nice weather~', and 'today is warm' is stored in the memory 160 in a state of being mapped to a specific pattern in relation to the weather application. In this case, such a recommended word as 'it's raining', how about a shot of soju it's raining?', 'what a bad weather', 'nice weather~', and 'today is warm' is associated with a specific weather and such a recommended word as 'check weather~', and 'let's meet!' is not associated with a specific weather.

If the first touch input is detected, the controller 180 controls the display 151 to display the first GUIs 210, which respectively correspond to a recommended word associated with information on a position on the display 151 in which a trajectory of the specific pattern is displayed and a recommended word not associated with the information on the position on the display 151 in which the trajectory of the specific pattern is displayed among the recommended words stored in the memory in a manner of being mapped to the specific pattern in relation to the weather application. For instance, as depicted in FIG. 11 (a), the recommended word associated with the information on the position on the display 151 in which the trajectory of the specific pattern is displayed corresponds to 'it's raining', how about a shot of soju it's raining?', and 'what a bad weather' and the recommended word not associated with the information on the position on the display 151 in which the trajectory of the specific pattern is displayed corresponds to 'check weather~', and 'let's meet!'.

The user input unit 130 receives a second touch input for selecting one of the first GUI 210.

As depicted in FIG. 11 (b), if the second touch input is detected, the controller 180 controls the display 151 to display a recommended word 211 corresponding to the selected first GUI 210 in the vicinity of the trajectory 201 of the specific pattern.

If a user touches the first GUI 210 corresponding to such a recommended word as 'how about a shot of soju it's raining?', the recommended word 211 'how about a shot of soju it's raining?' corresponding to the touched first GUI 210 is displayed in the display 151.

According to the present embodiment, a memo for more satisfying an intention of a user can be completed in a manner that a recommended word associated with a position where a user has drawn a specific pattern on a screen of the display 151 is recommended.

Figure 12:
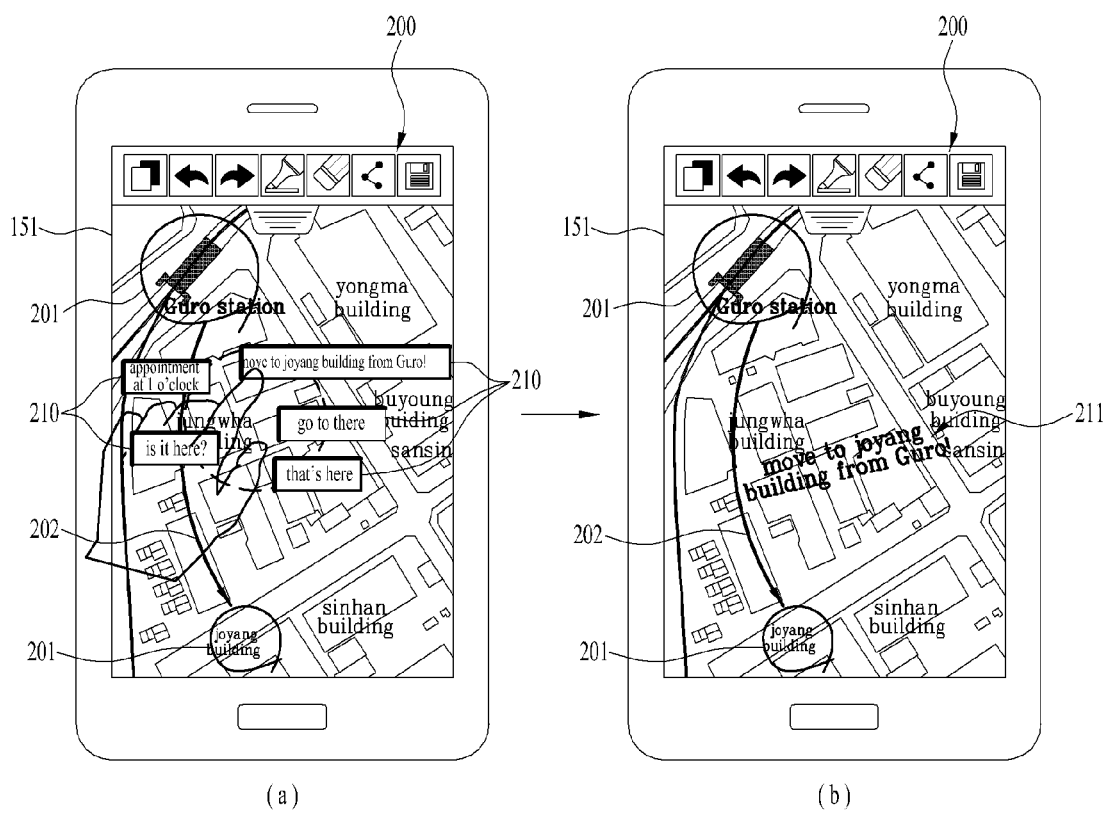
FIG. 12 is a diagram for a screen of a display of a mobile terminal according to one embodiment of the present invention.

FIG. 12 is a diagram for a screen of a display of a mobile terminal according to one embodiment of the present invention.

The mobile terminal 100 is in a state that a memo mode is activated while a first application is executing. FIG. 12 shows an example that the first application corresponds to a map application.

As depicted in FIG. 12 (a), the user input unit 130 receives a first touch input of a specific pattern in the memo mode. The controller 180 displays trajectories 201/202 of the specific pattern via the display 151. In the present embodiment, a specific pattern of a circle form and a specific pattern of an arrow form are inputted. Hence, the trajectory 201 of the specific pattern of the circle form and the trajectory 202 of the specific pattern of the arrow form are displayed, respectively in the display.

The controller 180 controls the display 151 to display first GUIs 210, which respectively correspond to recommended words associated with the first application among at least two recommended words corresponding to the specific pattern. In this case, at least one of the recommended words corresponding to the first GUIs 210 may be associated with information on a position on the display 151 in which the trajectory of the specific pattern is displayed among information associated with the first application.

The information associated with the first application is information obtainable via the first application. For instance, if the first application corresponds to a map application, the information may correspond to information on location information, address information, area name information, and the like.

For instance, the controller 180 configures a recommended word 'move to a joyang building from Guro!' using location information (e.g., GPS coordinate) of a position as information on the position on the display 151 in which the trajectory 201 of the specific pattern of the circle form is displayed and direction information of the specific pattern of the arrow form and may be then able to control the display 151 to display the first GUI 210 corresponding to the recommended word.

The user input unit 130 receives a second touch input for selecting one of the first GUI 210.

As depicted in FIG. 12 (b), if the second touch input is detected, the controller 180 controls the display 151 to display a recommended word 211 corresponding to the selected first GUI 210 in the vicinity of the trajectory 201 of the specific pattern.

If a user touches the first GUI 210 corresponding to such a recommended word as 'move to a joyang building from Guro!', the recommended word 211 'move to a joyang building from Guro!' corresponding to the touched first GUI 210 is displayed in the display 151.

According to embodiment, of course, if a preferred recommended word is not included in the recommended words contained in the first GUI 210 corresponding to a specific pattern, a user can add a memo in a manner of directly drawing a pattern on a screen of the display 151. In the state that the memo mode is activated, if a pattern except predetermined patterns is inputted on the screen of the display 151, the controller 180 can control the memory 160 to store the inputted pattern as a recommended word corresponding to the first application by adding the inputted pattern.

Meanwhile, according to the present invention, additional information can be included in a memo as well as a recommended word selected by a user. Regarding this, it shall be explained with reference to FIG. 13 to FIG. 17.

Figure 13:
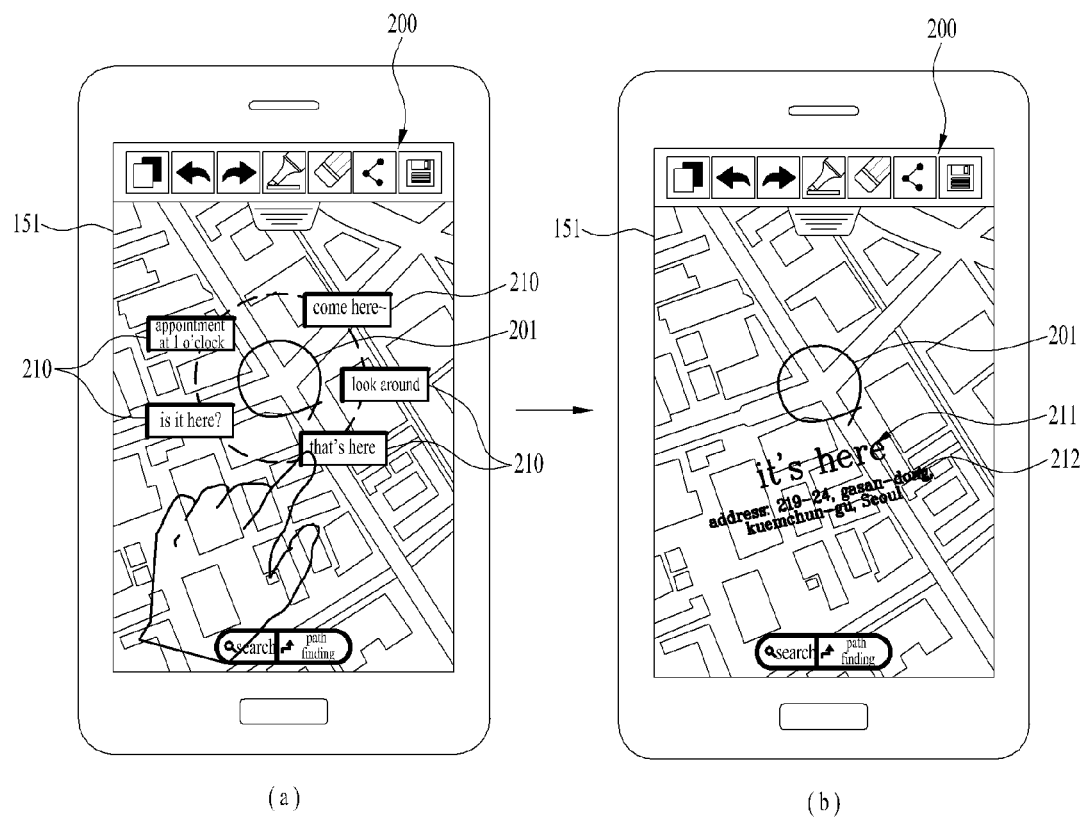
FIG. 13 is a diagram for a screen of a display of a mobile terminal according to one embodiment of the present invention.

FIG. 13 is a diagram for a screen of a display of a mobile terminal according to one embodiment of the present invention.

The mobile terminal 100 is in a state that a memo mode is activated while a first application is executing. FIG. 13 shows an example that the first application corresponds to a map application.

As depicted in FIG. 13 (a), the user input unit 130 receives a first touch input of a specific pattern in the memo mode. The controller 180 displays a trajectory 201 of the specific pattern via the display 151.

The controller 180 controls the display 151 to display first GUIs 210, which respectively correspond to recommended words associated with the first application among at least two recommended words corresponding to the specific pattern.

The user input unit 130 receives a second touch input for selecting one of the first GUIs 210.

As depicted in FIG. 13 (b), if the second touch input is detected, the controller 180 controls the display 151 to display a recommended word 211 corresponding to the selected first GUI 210 in the vicinity of the trajectory 201 of the specific pattern.

And, the controller 180 controls the display 151 to display information 212 corresponding to a position on the display 151 in which the trajectory 210 of the specific pattern is displayed among information associated with the first application. For clarity, the information on the position on the display 151 in which the trajectory 201 of the specific pattern is displayed is called additional information.

The information associated with the first application may correspond to information obtainable by utilizing a different application or a program based on information obtained via the first application as well as the information directly obtainable via the first application. And, the additional information may include information received from external via the wireless communication unit 110 or the sensing unit 140.

As an example, referring to FIG. 13 (b), the controller 180 can control the display 151 to display address information using a GPS coordinate of a position as information 212 corresponding to the position on the display 151 in which the trajectory 201 of the specific pattern is displayed among the information associated with the map application.

According to embodiment, the additional information 212 may be displayed in the display 151 only when a predetermined specific first GUI 210 is selected from a plurality of the first GUIs 210 displayed in a screen of the display 151. For instance, the additional information 212 can be displayed only when the first GUI 210, which respectively corresponds to 'is it here?' and 'it's here', is selected from five first GUIs 210 depicted in FIG. 13 (a).

The trajectory 201 of the specific pattern, the recommended word corresponding to the selected first GUI 211, and the additional information 212 are displayed in one screen of the display 151 and may be displayed in a manner of overlaying an execution screen of the first application.

Figure 14:
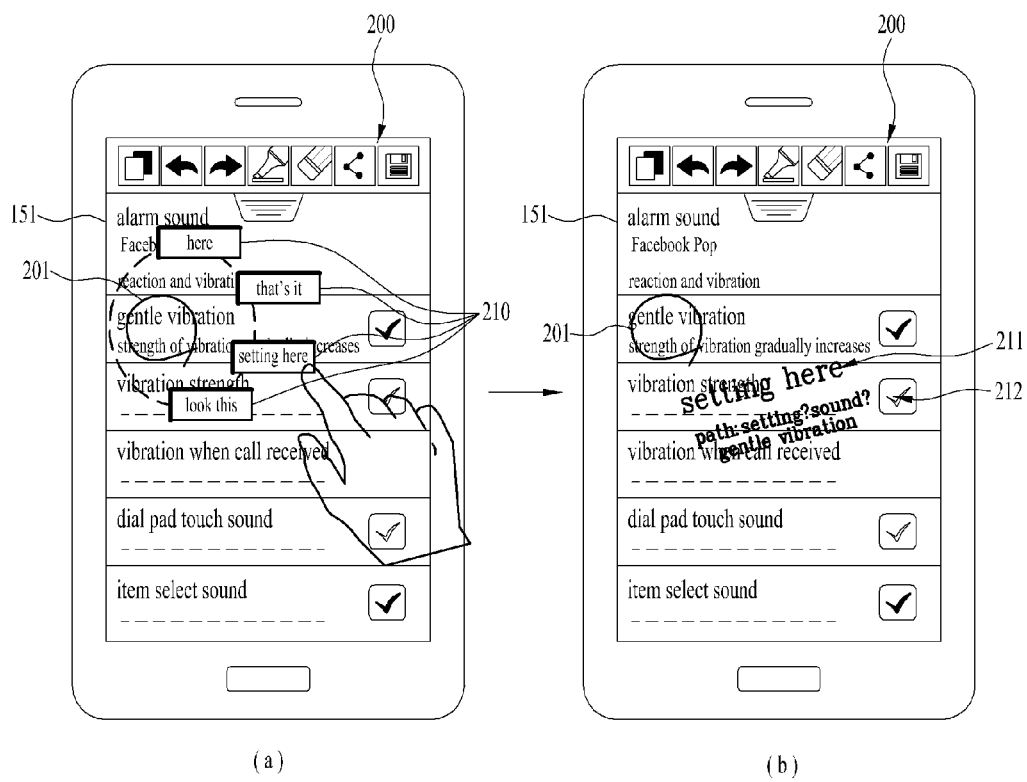
FIG. 14 is a diagram for a screen of a display of a mobile terminal according to one embodiment of the present invention.

FIG. 14 is a diagram for a screen of a display of a mobile terminal according to one embodiment of the present invention.

The mobile terminal 100 is in a state that a memo mode is activated while a first application is executing. FIG. 14 shows an example that the first application corresponds to an environment setting application.

As depicted in FIG. 14 (a), the user input unit 130 receives a first touch input of a specific pattern in the memo mode. The controller 180 displays a trajectory 201 of the specific pattern via the display 151.

The controller 180 controls the display 151 to display first GUIs 210, which respectively correspond to recommended words associated with the first application among at least two recommended words corresponding to the specific pattern.

The user input unit 130 receives a second touch input for selecting one of the first GUIs 210.

As depicted in FIG. 14 (b), if the second touch input is detected, the controller 180 controls the display 151 to display a recommended word 211 corresponding to the selected first GUI 210 in the vicinity of the trajectory 201 of the specific pattern.

And, the controller 180 controls the display 151 to display information 212 corresponding to a position on the display 151 in which the trajectory 210 of the specific pattern is displayed among information associated with the first application. For clarity, the information corresponding to the position on the display 151 in which the trajectory 201 of the specific pattern is displayed is called additional information.

As an example, referring to FIG. 14 (b), among the information associated with the environment setting application, the controller 180 can control the display 151 to display information for explaining a setting path of a menu option of a position as the information corresponding to the position on the display 151 in which the trajectory 201 of the specific pattern is displayed.

According to embodiment, the additional information 212 may be displayed in the display 151 only when a predetermined specific first GUI 210 is selected from a plurality of the first GUIs 210 displayed in a screen of the display 151. For instance, the additional information 212 can be displayed only when the first GUI 210, which corresponds to 'setting here', is selected from four first GUIs 210 depicted in FIG. 14 (a).

Figure 15:
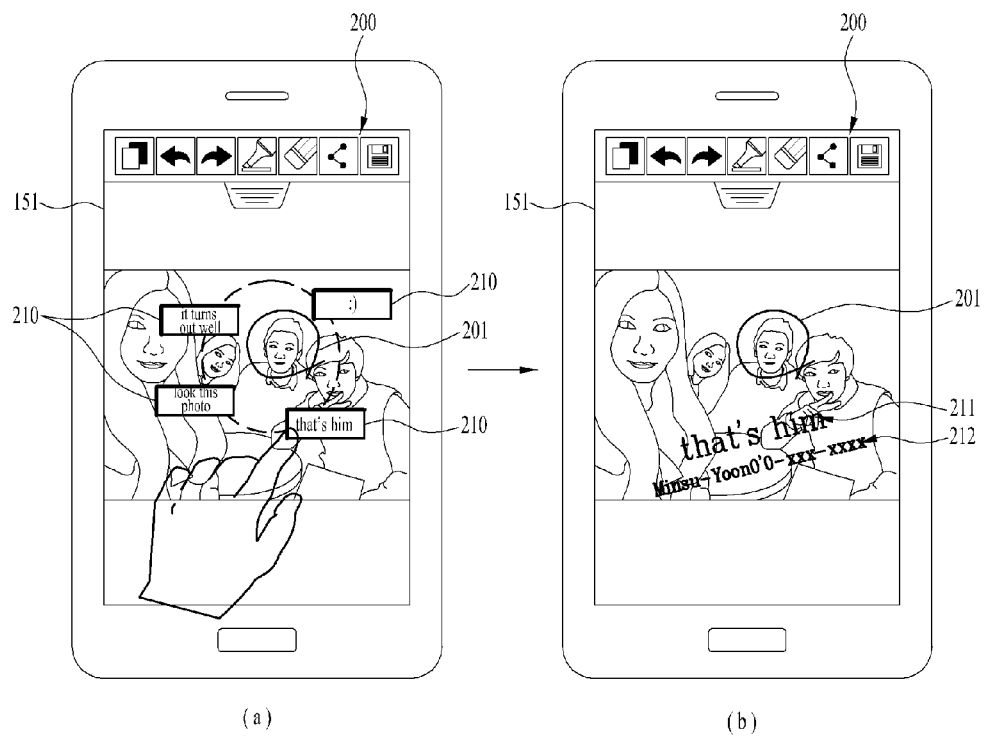
FIG. 15 is a diagram for a screen of a display of a mobile terminal according to one embodiment of the present invention.

FIG. 15 is a diagram for a screen of a display of a mobile terminal according to one embodiment of the present invention.

The mobile terminal 100 is in a state that a memo mode is activated while a first application is executing. FIG. 15 shows an example that the first application corresponds to a gallery application.

As depicted in FIG. 15 (a), the user input unit 130 receives a first touch input of a specific pattern in the memo mode. The controller 180 displays a trajectory 201 of the specific pattern via the display 151.

The controller 180 controls the display 151 to display first GUIs 210, which respectively correspond to recommended words associated with the first application among at least two recommended words corresponding to the specific pattern.

The user input unit 130 receives a second touch input for selecting one of the first GUIs 210.

As depicted in FIG. 15 (b), if the second touch input is detected, the controller 180 controls the display 151 to display a recommended word 211 corresponding to the selected first GUI 210 in the vicinity of the trajectory 201 of the specific pattern.

And, the controller 180 controls the display 151 to display information 212 corresponding to a position on the display 151 in which the trajectory 210 of the specific pattern is displayed among information associated with the first application. For clarity, the information corresponding to the position on the display 151 in which the trajectory 201 of the specific pattern is displayed is called additional information.

As an example, referring to FIG. 15 (b), the controller 180 can control the display 151 to recognize a face of an object corresponding to a position on the display 151 in which the trajectory 201 of the specific pattern is displayed, extract personal information corresponding to the recognized face from a contact application in the memory 160, and display the extracted personal information as the additional information 212. The personal information may mean a name, a telephone number, an address, or the like. The memory 160 stores an algorithm or a program necessary for recognizing a face in advance. Assume that the contact application is interlocked with the memo mode.

According to embodiment, the additional information 212 may be displayed in the display 151 only when a predetermined specific first GUI 210 is selected from a plurality of the first GUIs 210 displayed in a screen of the display 151. For instance, the additional information 212 can be displayed only when the first GUI 210, which corresponds to 'that's him', is selected from four first GUIs 210 depicted in FIG. 15 (a).

Figure 16:
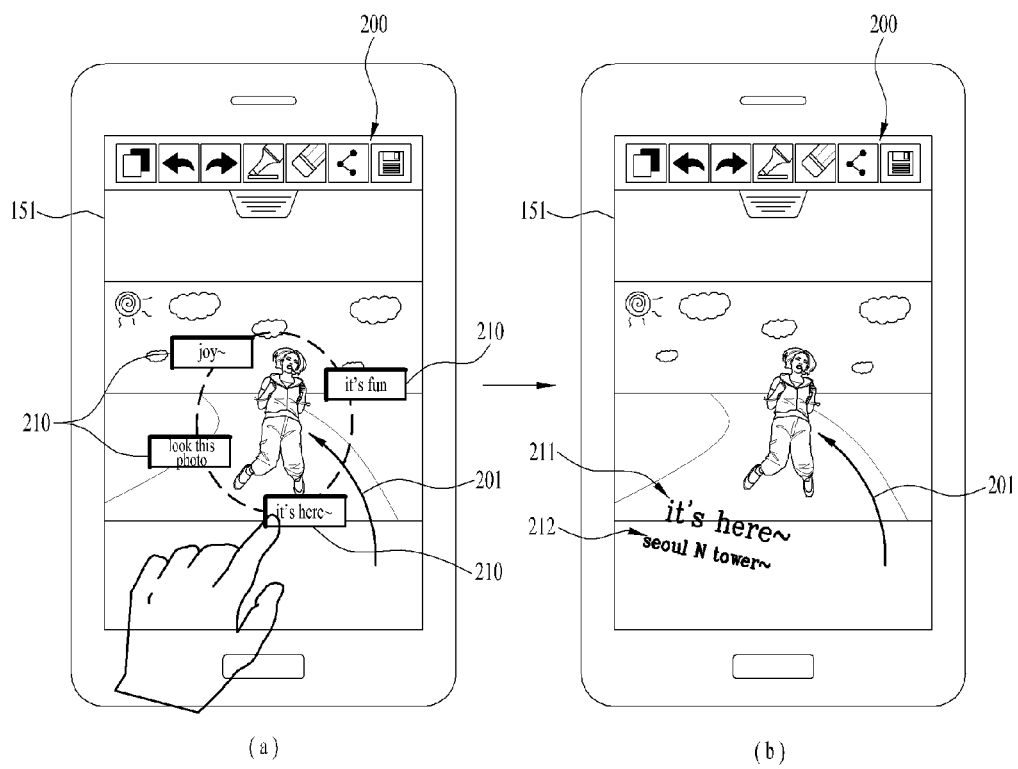
FIG. 16 is a diagram for a screen of a display of a mobile terminal according to one embodiment of the present invention.

FIG. 16 is a diagram for a screen of a display of a mobile terminal according to one embodiment of the present invention.

The mobile terminal 100 is in a state that a memo mode is activated while a first application is executing. FIG. 16 shows an example that the first application corresponds to a gallery application.

As depicted in FIG. 16 (a), the user input unit 130 receives a first touch input of a specific pattern in the memo mode. The controller 180 displays a trajectory 201 of the specific pattern via the display 151.

The controller 180 controls the display 151 to display first GUIs 210, which respectively correspond to recommended words associated with the first application among at least two recommended words corresponding to the specific pattern.

The user input unit 130 receives a second touch input for selecting one of the first GUIs 210.

As depicted in FIG. 16 (b), if the second touch input is detected, the controller 180 controls the display 151 to display a recommended word 211 corresponding to the selected first GUI 210 in the vicinity of the trajectory 201 of the specific pattern.

And, the controller 180 controls the display 151 to display information associated with the first application as additional information 212.

As an example, referring to FIG. 16 (b), the controller 180 can control the display 151 to display the additional information 212 on a location at which an image is obtained using location information (e.g., GPS coordinate), which is stored when the image displayed in a screen of the display 151 is obtained. The additional information 212 on the location at which the image is obtained may mean an address, a business name, a facility name, and the like.

According to embodiment, the additional information 212 may be displayed in the display 151 only when a predetermined specific first GUI 210 is selected from a plurality of the first GUIs 210 displayed in a screen of the display 151. For instance, the additional information 212 can be displayed only when the first GUI 210, which corresponds to 'it's here~', is selected from four first GUIs 210 depicted in FIG. 16 (a).

Figure 17:
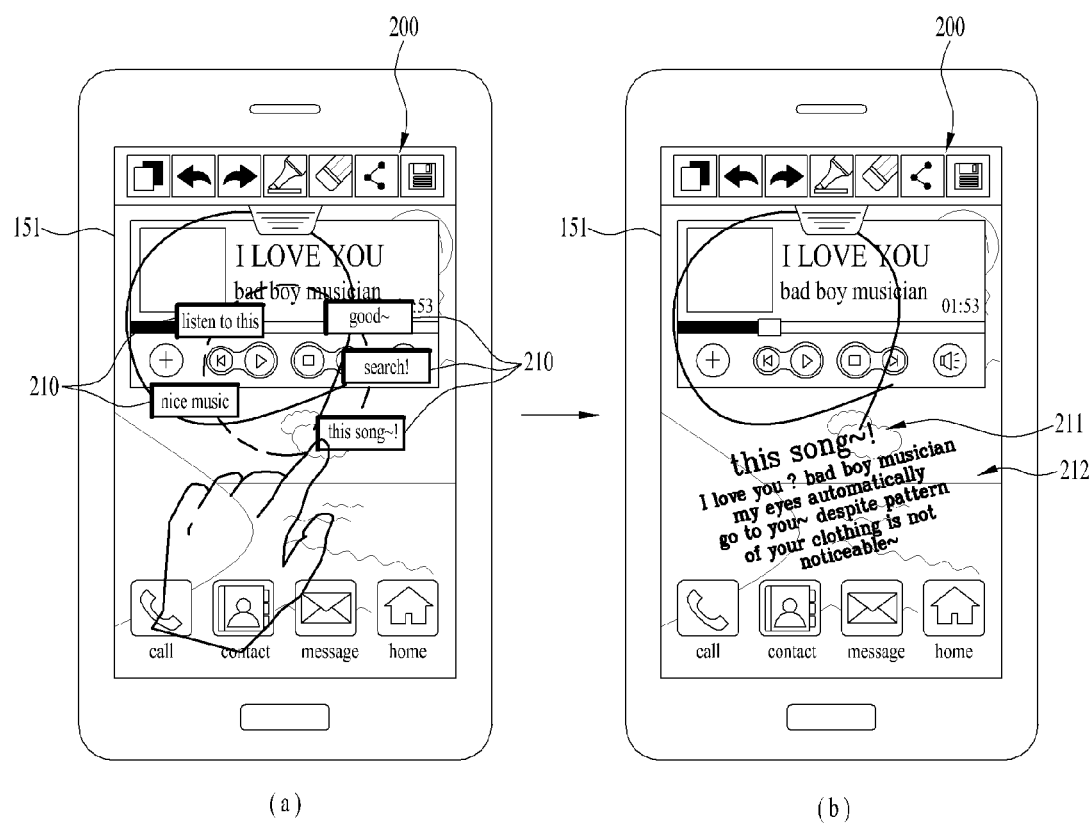
FIG. 17 is a diagram for a screen of a display of a mobile terminal according to one embodiment of the present invention.

FIG. 17 is a diagram for a screen of a display of a mobile terminal according to one embodiment of the present invention.

The mobile terminal 100 is in a state that a memo mode is activated while a first application is executing. FIG. 17 shows an example that the first application corresponds to a music playback application.

As depicted in FIG. 17 (a), the user input unit 130 receives a first touch input of a specific pattern in the memo mode. The controller 180 displays a trajectory 201 of the specific pattern via the display 151.

The controller 180 controls the display 151 to display first GUIs 210, which respectively correspond to recommended words associated with the first application among at least two recommended words corresponding to the specific pattern.

The user input unit 130 receives a second touch input for selecting one of the first GUIs 210.

As depicted in FIG. 17 (b), if the second touch input is detected, the controller 180 controls the display 151 to display a recommended word 211 corresponding to the selected first GUI 210 in the vicinity of the trajectory 201 of the specific pattern.

And, the controller 180 controls the display 151 to display information 212 corresponding to a position on the display 151 in which the trajectory 210 of the specific pattern is displayed among information associated with the first application. For clarity, the information corresponding to the position on the display 151 in which the trajectory 201 of the specific pattern is displayed is called additional information.

As an example, referring to FIG. 17 (b), the controller 180 can control the display 151 to display such additional information as a title, a singer, and lyrics of music associated with a position as the information 212, which corresponds to the position on the display 151 in which the trajectory 201 of the specific pattern is displayed.

According to embodiment, the additional information 212 may be displayed in the display 151 only when a predetermined specific first GUI 210 is selected from a plurality of the first GUIs 210 displayed in a screen of the display 151. For instance, the additional information 212 can be displayed only when the first GUI 210, which respectively corresponds to 'search~?' and 'this song~!', is selected from five first GUIs 210 depicted in FIG. 17 (a).

According to embodiment, when the first touch input of the specific pattern is detected, it may design the controller 180 to display information corresponding to a position on the display 151 in which the trajectory of the specific pattern is displayed only instead of displaying a GUI corresponding to a recommended word in the display 151.

Meanwhile, according to the present invention, a user may select additional information which is to be included in a memo. Regarding this, it shall be described with reference to FIG. 18 to FIG. 22.

Figure 18:
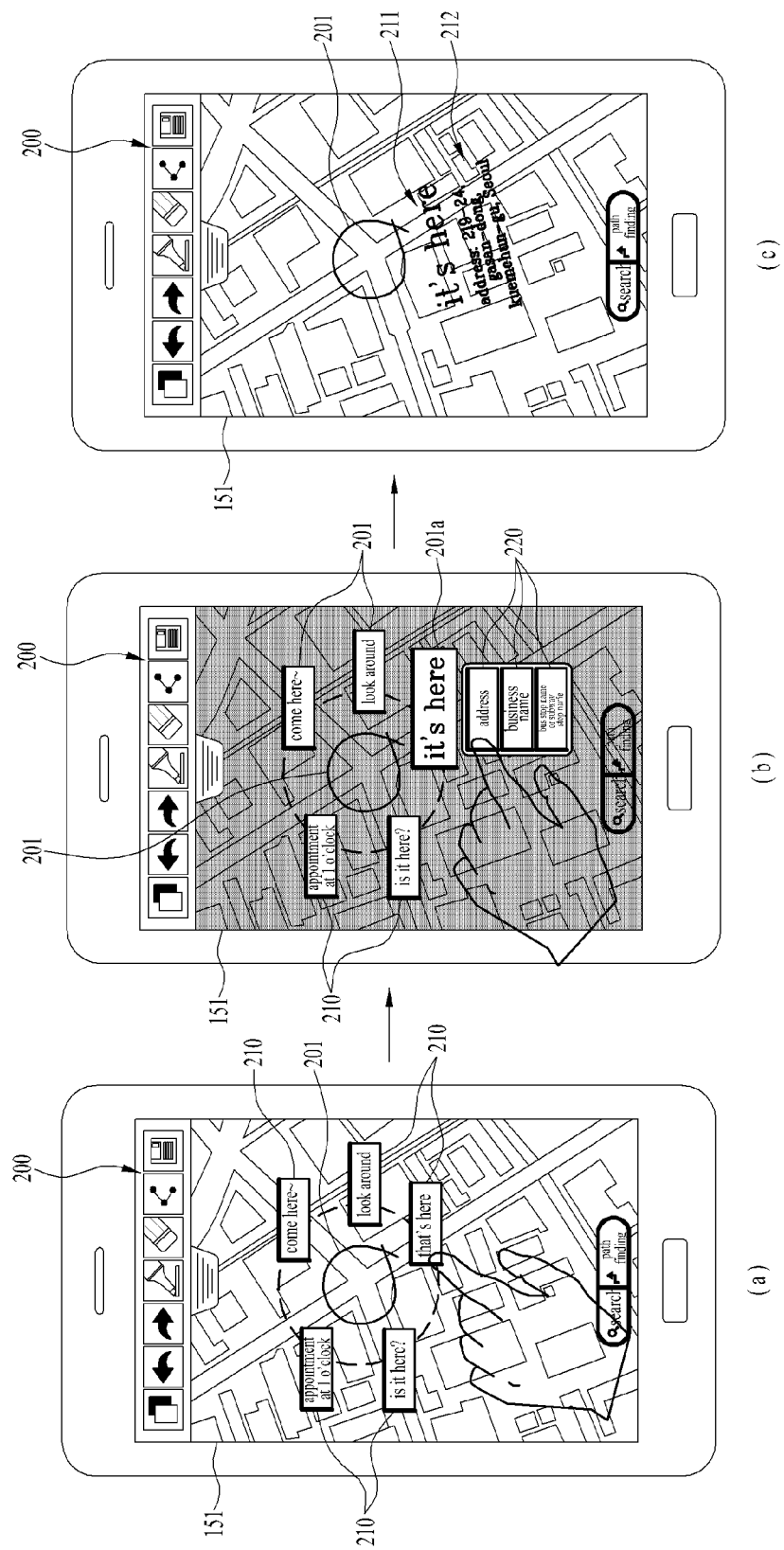
FIG. 18 is a diagram for a screen of a display of a mobile terminal according to one embodiment of the present invention.

FIG. 18 is a diagram for a screen of a display of a mobile terminal according to one embodiment of the present invention.

The mobile terminal 100 is in a state that a memo mode is activated while a first application is executing. FIG. 18 shows an example that the first application corresponds to a map application.

As depicted in FIG. 18 (a), the user input unit 130 receives a first touch input of a specific pattern in the memo mode. The controller 180 displays a trajectory 201 of the specific pattern via the display 151.

The controller 180 controls the display 151 to display first GUIs 210, which respectively correspond to recommended words associated with the first application among at least two recommended words corresponding to the specific pattern.

The user input unit 130 receives a second touch input for selecting one of the first GUIs 210.

As depicted in FIG. 18 (b), the controller 180 controls the display 151 to display second GUIs 220, which respectively correspond to information corresponding to a position on the display 151 in which the trajectory 201 of the specific pattern is displayed among information associated with the first application. For clarity, the information corresponding to the position on the display 151 in which the trajectory 201 of the specific pattern is displayed is called additional information.

The information associated with the first application may correspond to information obtainable by utilizing a different application or a program based on information obtained via the first application as well as the information directly obtainable via the first application.

As an example, if the first application corresponds to a map application, the additional information corresponding to the second GUIs 220 may correspond to an actual address, a business name, a bus stop name or a subway stop name, or the like of a point corresponding to a position on the display 151 in which the trajectory 201 of the specific pattern is displayed among information associated with the map application.

If the second GUIs 220 are displayed in the display 151, the remaining area can be displayed in an inactivated state except the second GUIs 220 used for selecting additional information. And, in order to make a user clearly recognize a selected first GUI 210a, the selected first GUI 210a can be displayed as larger than the remaining first GUIs 210 in size.

The user input unit 130 receives a third touch input for selecting one of the second GUIs 220.

As depicted in FIG. 18 (c), if the third touch input is detected, the controller 180 controls the display 151 to display additional information 212 corresponding to the selected second GUI 220.

If a user touches the second GUI 220 corresponding to 'address', an actual address of a corresponding point can be displayed in the display 151 as the additional information 212 corresponding to the touched second GUI 220.

The trajectory 201 of the specific pattern, the recommended word corresponding to the selected first GUI 211 and the additional information are displayed in one screen of the display 151 and may be displayed in a manner of overlaying an execution screen of the first application.

Figure 19:
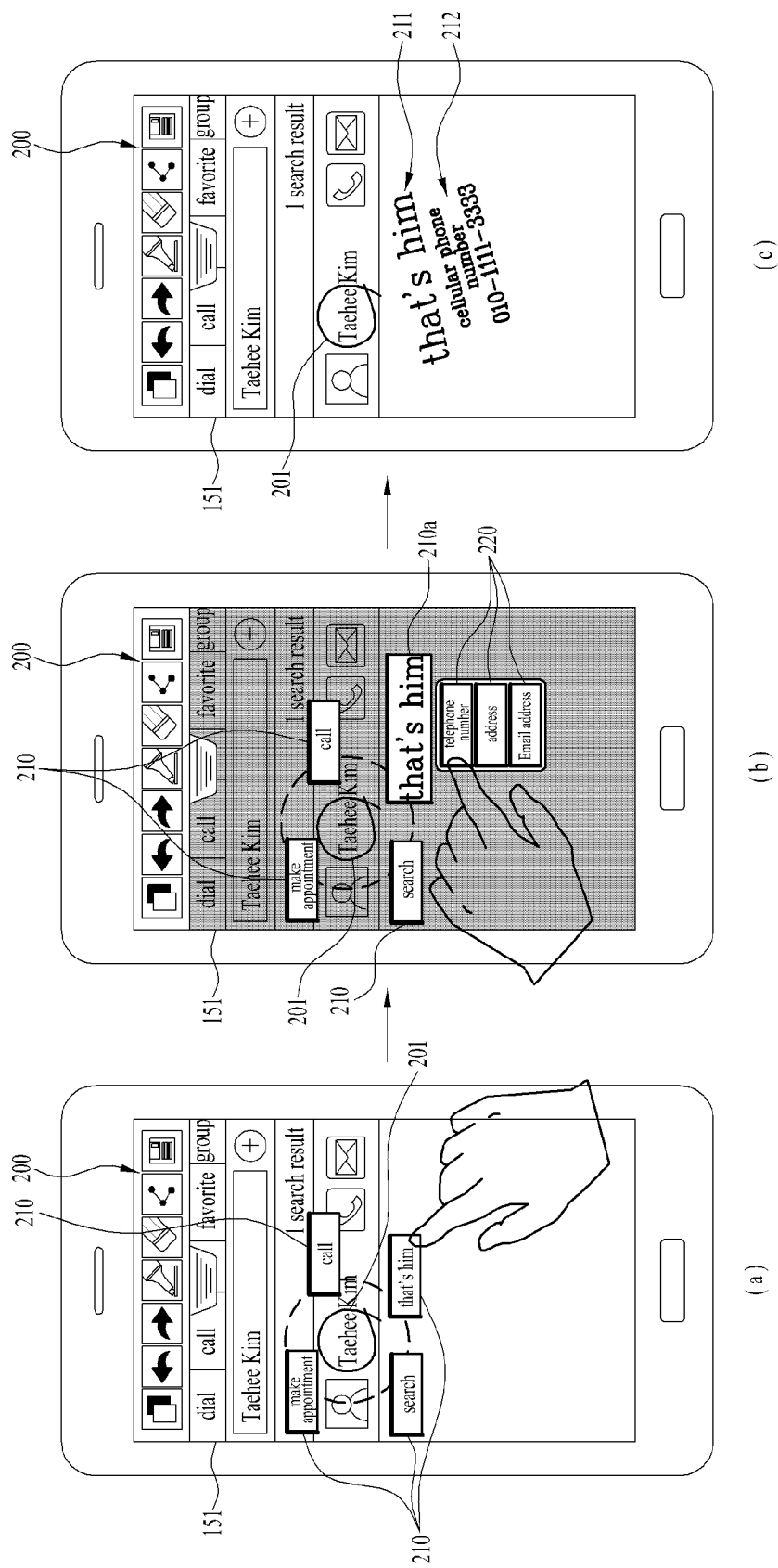
FIG. 19 is a diagram for a screen of a display of a mobile terminal according to one embodiment of the present invention.

FIG. 19 is a diagram for a screen of a display of a mobile terminal according to one embodiment of the present invention.

The mobile terminal 100 is in a state that a memo mode is activated while a first application is executing. FIG. 19 shows an example that the first application corresponds to a contact application.

As depicted in FIG. 19 (a), the user input unit 130 receives a first touch input of a specific pattern in the memo mode. The controller 180 displays a trajectory 201 of the specific pattern via the display 151.

The controller 180 controls the display 151 to display first GUIs 210, which respectively correspond to recommended words associated with the first application among at least two recommended words corresponding to the specific pattern.

The user input unit 130 receives a second touch input for selecting one of the first GUIs 210.

As depicted in FIG. 19 (b), the controller 180 controls the display 151 to display second GUIs 220, which respectively correspond to information corresponding to a position on the display 151 in which the trajectory 201 of the specific pattern is displayed among information associated with the first application. For clarity, the information corresponding to the position on the display 151 in which the trajectory 201 of the specific pattern is displayed is called additional information.

As an example, if the first application corresponds to the contact application, the additional information corresponding to the second GUIs 220 may correspond to an address of a person, a telephone number, an e-mail address, or the like corresponding to a position on the display 151 in which the trajectory 201 of the specific pattern is displayed among information associated with the contact application.

The user input unit 130 receives a third touch input for selecting one of the second GUIs 220.

As depicted in FIG. 19 (*c*), if the third touch input is detected, the controller 180 controls the display 151 to display additional information 212 corresponding to the selected second GUI 220.

If a user touches the second GUI 220 corresponding to 'telephone number', a wired telephone number or a cellular phone number of a corresponding person can be displayed in the display 151 as the additional information 212 corresponding to the touched second GUI 220.

Figure 20:
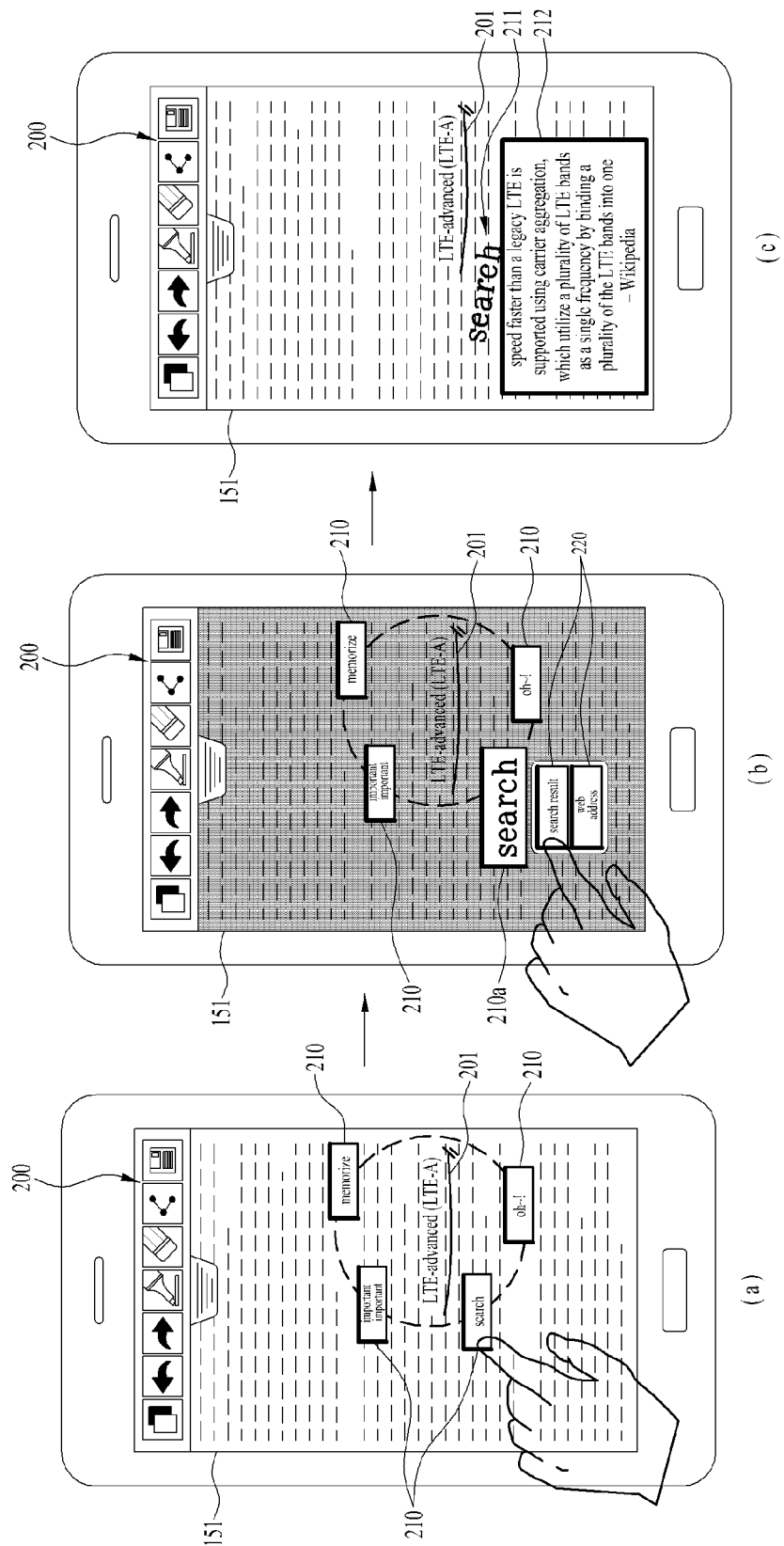
FIG. 20 is a diagram for a screen of a display of a mobile terminal according to one embodiment of the present invention.

FIG. 20 is a diagram for a screen of a display of a mobile terminal according to one embodiment of the present invention.

The mobile terminal 100 is in a state that a memo mode is activated while a first application is executing. FIG. 20 shows an example that the first application corresponds to a web service application.

As depicted in FIG. 20 (*a*), the user input unit 130 receives a first touch input of a specific pattern in the memo mode. The controller 180 displays a trajectory 201 of the specific pattern via the display 151.

The controller 180 controls the display 151 to display first GUIs 210, which respectively correspond to recommended words associated with the first application among at least two recommended words corresponding to the specific pattern.

The user input unit 130 receives a second touch input for selecting one of the first GUIs 210.

As depicted in FIG. 20 (*b*), the controller 180 controls the display 151 to display second GUIs 220, which respectively correspond to information corresponding to a position on the display 151 in which the trajectory 201 of the specific pattern is displayed among information associated with the first application. For clarity, the information corresponding to the position on the display 151 in which the trajectory 201 of the specific pattern is displayed is called additional information.

As an example, if the first application corresponds to the web service application, the additional information corresponding to the second GUIs 220 may correspond to content of a search result corresponding to a position on the display 151 in which the trajectory 201 of the specific pattern is displayed, a URL address of a web page displayed in a screen of the display 151, a title of the web page displayed in the screen of the display, or the like among information associated with the web service application. The search result can be provided by a predetermined search engine capable of being interlocked with the first application.

The user input unit 130 receives a third touch input for selecting one of the second GUIs 220.

As depicted in FIG. 19 (*c*), if the third touch input is detected, the controller 180 controls the display 151 to display additional information 212 corresponding to the selected second GUI 220.

If a user touches the second GUI 220 corresponding to 'telephone number', a wired telephone number or a cellular phone number of a corresponding person can be displayed in the display 151 as the additional information 212 corresponding to the touched second GUI 220

As depicted in FIG. 20 (*c*), if the third touch input is detected, the controller 180 controls the display 151 to display additional information 212 corresponding to the selected second GUI 220.

If a user touches the second GUI 220 corresponding to 'search result', a search result of corresponding content can be displayed in the display 151 as the additional information 212 corresponding to the touched second GUI 220.

Figure 21:
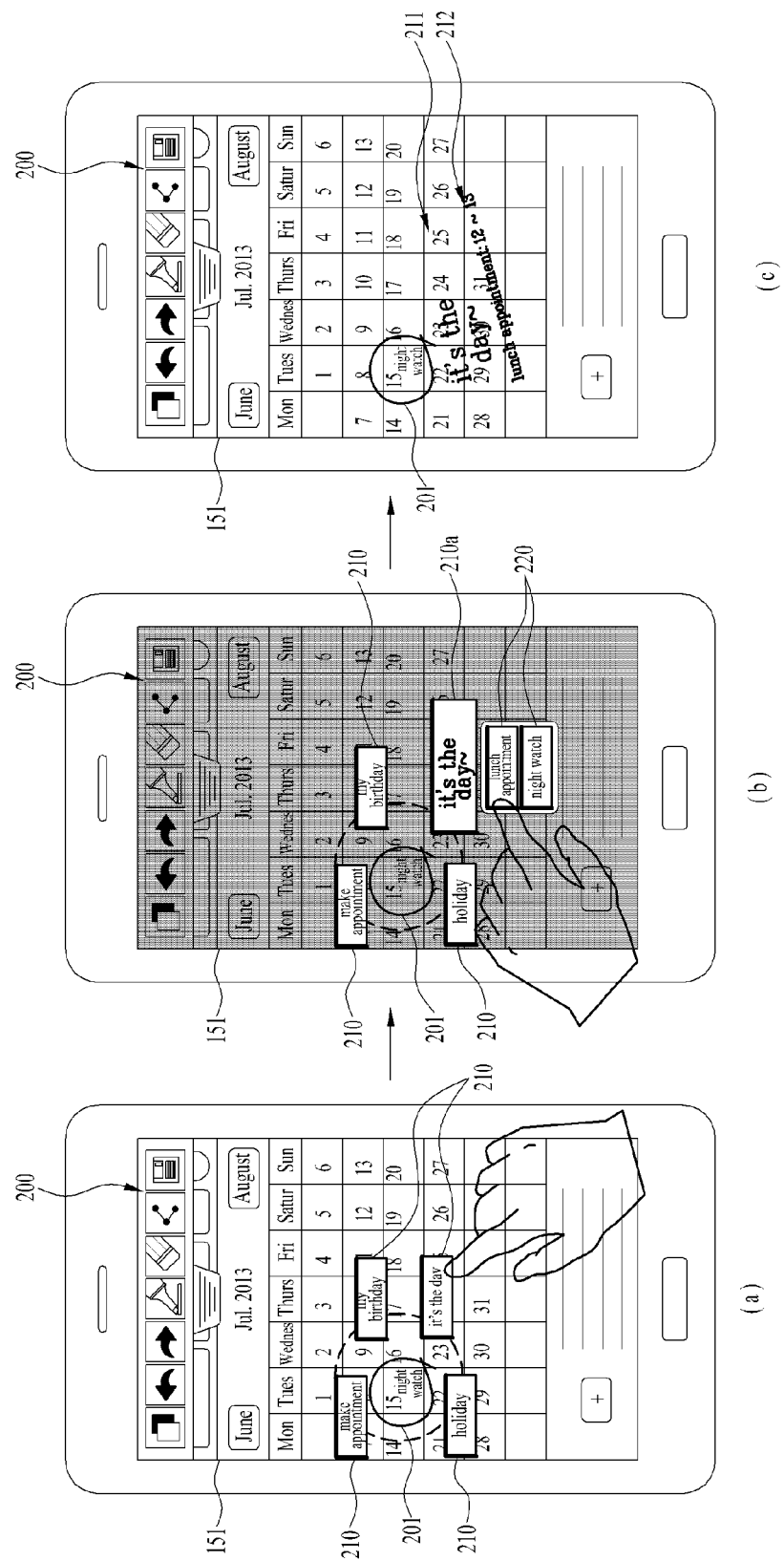
FIG. 21 is a diagram for a screen of a display of a mobile terminal according to one embodiment of the present invention.

FIG. 21 is a diagram for a screen of a display of a mobile terminal according to one embodiment of the present invention.

The mobile terminal 100 is in a state that a memo mode is activated while a first application is executing. FIG. 21 shows an example that the first application corresponds to a calendar application.

As depicted in FIG. 21 (*a*), the user input unit 130 receives a first touch input of a specific pattern in the memo mode. The controller 180 displays a trajectory 201 of the specific pattern via the display 151.

The controller 180 controls the display 151 to display first GUIs 210, which respectively correspond to recommended words associated with the first application among at least two recommended words corresponding to the specific pattern.

The user input unit 130 receives a second touch input for selecting one of the first GUIs 210.

As depicted in FIG. 21 (*b*), the controller 180 controls the display 151 to display second GUIs 220, which respectively correspond to information corresponding to a position on the display 151 in which the trajectory 201 of the specific pattern is displayed among information associated with the first application. For clarity, the information corresponding to the position on the display 151 in which the trajectory 201 of the specific pattern is displayed is called additional information.

As an example, if the first application corresponds to the calendar application, the additional information corresponding to the second GUIs 220 may correspond to a schedule of a date, appointment time, content of appointment, holiday information, or the like corresponding to a position on the display 151 in which the trajectory of the specific pattern is displayed among information associated with the calendar application.

For instance, if two schedules are pre-stored on 15$^{th}$, which is a date corresponding to the position on the display 151 in which the trajectory 201 of the specific pattern is displayed, and one of the two schedules corresponds to either a lunch appointment between 12 p.m. and 13 p.m. or a night watch between 6 p.m. and 10 p.m., the controller 180 controls the display 151 to display the second GUI 210 corresponding to 'lunch appointment' and the second GUI 210 corresponding to 'night watch'.

The user input unit 130 receives a third touch input for selecting one of the second GUIs 220.

As depicted in FIG. 20 (*c*), if the third touch input is detected, the controller 180 controls the display 151 to display additional information 212 corresponding to the selected second GUI 220.

If a user touches the second GUI 220 corresponding to 'lunch appointment', appointment content (lunch appointment) and appointment time (12~13) of a corresponding schedule can be displayed in the display 151 as the additional information 212 corresponding to the touched second GUI 220.

Figure 22:
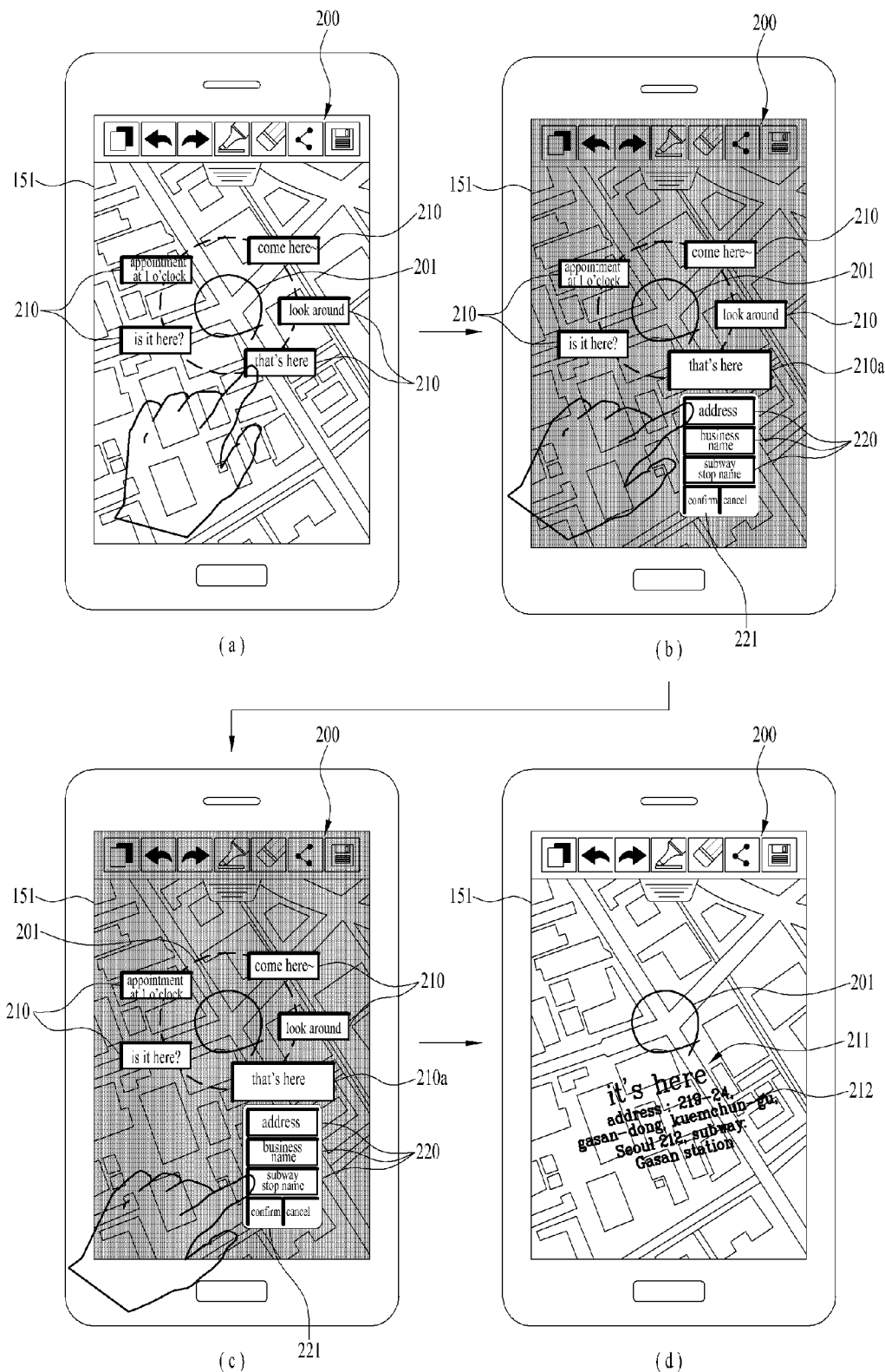
FIG. 22 is a diagram for a screen of a display of a mobile terminal according to one embodiment of the present invention.

FIG. 22 is a diagram for a screen of a display of a mobile terminal according to one embodiment of the present invention.

The mobile terminal 100 is in a state that a memo mode is activated while a first application is executing. FIG. 22 shows an example that the first application corresponds to a map application.

As depicted in FIG. 22 (*a*), the user input unit 130 receives a first touch input of a specific pattern in the memo mode. The controller 180 displays a trajectory 201 of the specific pattern via the display 151.

The controller 180 controls the display 151 to display first GUIs 210, which respectively correspond to recommended words associated with the first application among at least two recommended words corresponding to the specific pattern.

The user input unit 130 receives a second touch input for selecting one of the first GUIs 210.

As depicted in FIG. 22 (*b*), the controller 180 controls the display 151 to display second GUIs 220, which respectively correspond to information corresponding to a position on the display 151 in which the trajectory 201 of the specific pattern is displayed among information associated with the first application. For clarity, the information corresponding to the position on the display 151 in which the trajectory 201 of the specific pattern is displayed is called additional information.

As an example, if the first application corresponds to a map application, the additional information corresponding to the second GUIs 220 may correspond to an actual address, a business name, a bus stop name or a subway stop name, or the like of a point corresponding to a position on the display 151 in which the trajectory 201 of the specific pattern is displayed among information associated with the map application.

What is different point between the embodiment depicted in FIG. 22 and the embodiment depicted in FIG. 18 is to select a plurality of GUIs 220 in the embodiment depicted in FIG. 22.

The user input unit 130 receives a third touch input for selecting one of the second GUIs 220.

For instance, assume that three second GUIs 220 respectively corresponding to 'address', 'business name', and 'subway stop name' are displayed in the display 151 as the second GUI 220 respectively corresponding to a position on the display 151 in which the trajectory 201 of the specific pattern is displayed.

If a user selects the second GUI 220 corresponding to 'address', a background color of the selected second GUI 220 may change. And, as depicted in FIG. 22 (*c*), if the user selects the second GUI 220 corresponding to 'subway stop name', a background color of the selected second GUI 220 may change.

Subsequently, if the user select a confirm menu 221, the controller 180 controls the display 151 to display an actual address of a corresponding point and a neighboring subway stop name as the additional information 212 corresponding to the selected second GUI 220.

Meanwhile, according to the present invention, at least one application, which is capable of being interlocked with a specific keyword included in a recommended word selected by a user, can be interlocked with a memo function. Regarding this, it shall be described with reference to FIG. 23 to FIG. 25.

Figure 23:
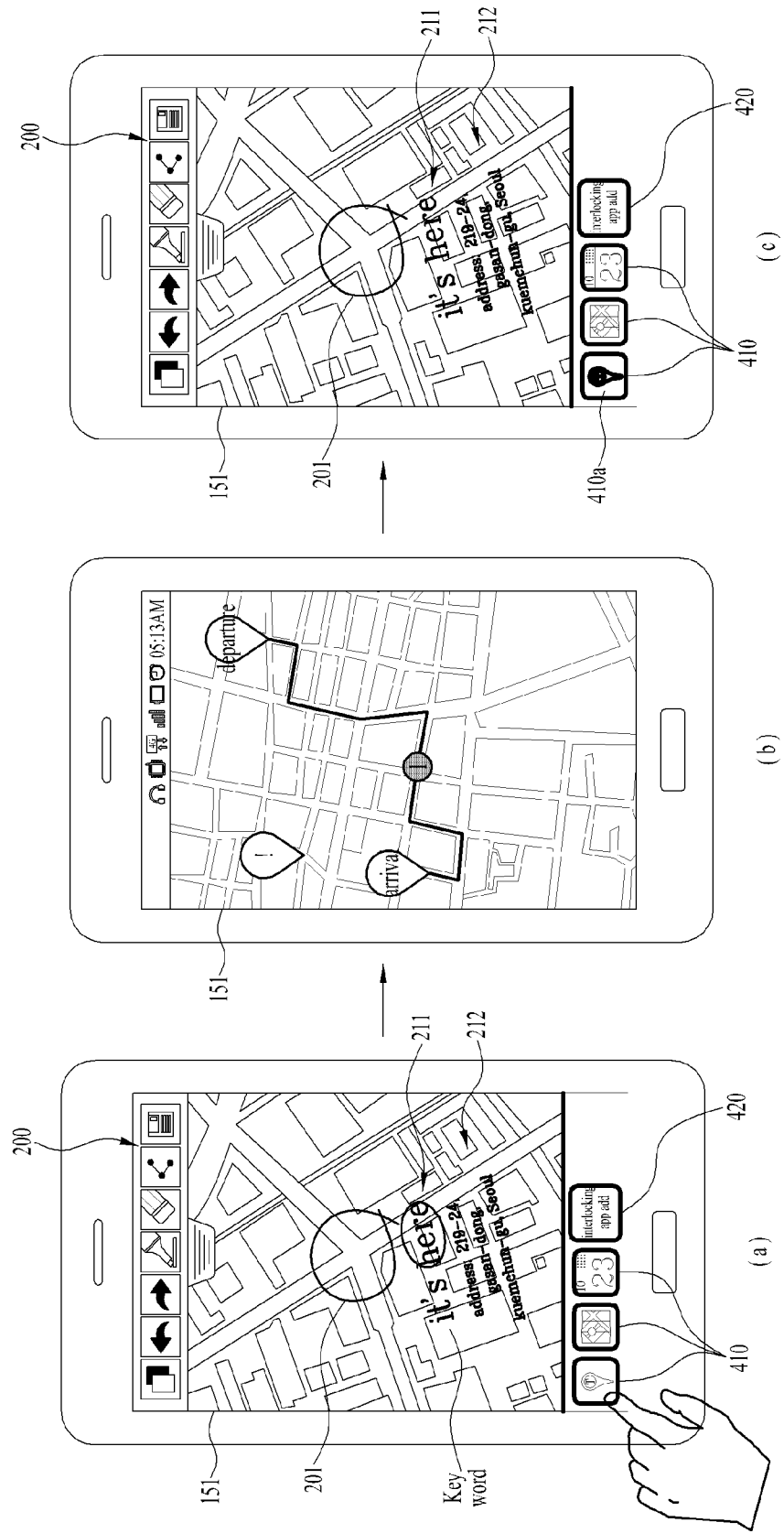
FIG. 23 is a diagram for a screen of a display of a mobile terminal according to one embodiment of the present invention.

FIG. 23 is a diagram for a screen of a display of a mobile terminal according to one embodiment of the present invention.

The mobile terminal 100 is in a state that a memo mode is activated while a first application is executing. FIG. 23 shows an example that the first application corresponds to a contact application.

Referring to FIG. 23 (*a*), a trajectory 201 of a specific pattern, a recommended word 211 corresponding to a first GUI 210 selected by a user, and additional information 212 corresponding to a second GUI 220 selected by the user are displayed in the display 151. Since a displaying process of the recommended word 211 and the additional information 212 is mentioned earlier, explanation on the process is omitted.

The controller 180 controls the display 151 to display icons 410, which respectively correspond to at least one second application capable of interlocking with a specific keyword (e.g., 'here') included in the recommended word 211 which is displayed in the display 151. The icons can be displayed in an inactivated state.

For instance, the icons 410 respectively corresponding to a navigation application, a map application, and a calendar application can be displayed in the display 151 as the second application capable of interlocking with the specific keyword such as 'here'.

The memory stores mapping data between a specific keyword and an interlocking application.

The user input unit 130 receives a fourth touch input for selecting one of the icons 410.

As depicted in FIG. 23 (*b*), the controller 180 executes the second application corresponding to the icon 410 selected by the fourth touch input. FIG. 23 (*b*) shows an example that the second application corresponding to the selected icon 410 corresponds to a navigation application.

The controller 180 configures the executed second application using the additional information 212. For instance, the controller 180 can configure a road guide service of the navigation application using current location information obtained via the position-location module 115 as departure information and using the additional information 212 as arrival information. The controller 180 may configure the executed second application using information corresponding to a position on the display 151 in which the trajectory 201 of the specific pattern is displayed among information associated with the first application except the additional information 212.

A screen of the display 151 depicted in FIG. 23 (*b*) is just an example. According to embodiment, a configuration screen itself of the second application may not be displayed in the display 151.

As depicted in FIG. 23 (*c*), the controller 180 controls the display 151 to display an icon 410*a* corresponding to the second application in which the configuration is completed in an active state. A user can recognize whether the second application is configured by a display state of the icon 410 changing from the inactive state to the active state.

Besides the navigation application, the map application, and the calendar application, a user can add a different application by selecting an interlocking app add menu 420.

Although FIG. 23 (*a*) explains an example that the trajectory 201 of the specific pattern, the recommended word 211 corresponding to the first GUI 210 selected by the user, and the additional information 212 corresponding to the second GUI 220 selected by the user are displayed in the display 151, it is apparent that the present embodiment can also be applied to a case that the trajectory 201 of the specific pattern and the recommended word 211 are displayed in the display 151 only without the additional information 212. In this case, the controller 180 can configure the executed second application using information corresponding to a position on the display 151 in which the trajectory 201 of the specific pattern is displayed among information associated with the first application.

Figure 24:
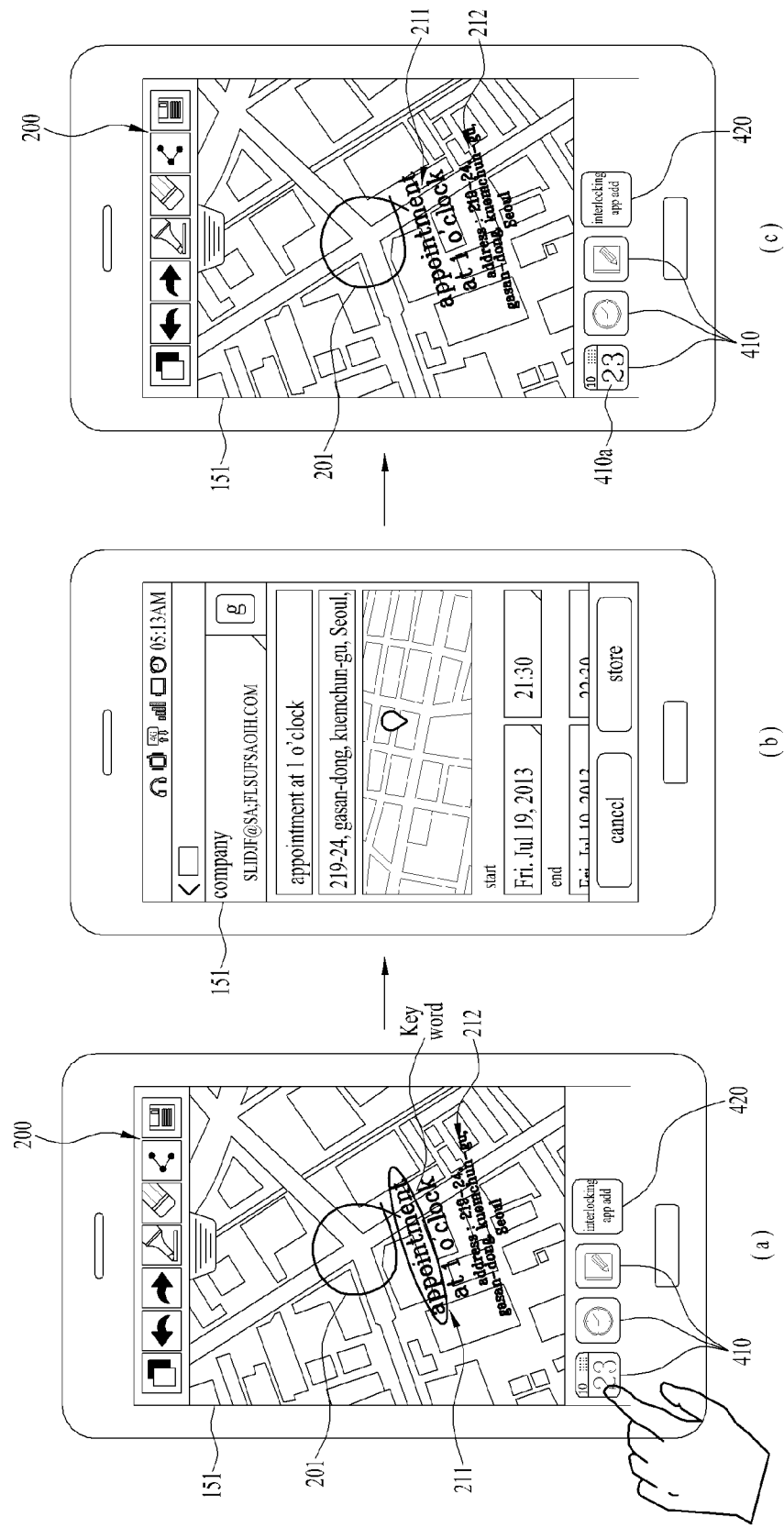
FIG. 24 is a diagram for a screen of a display of a mobile terminal according to one embodiment of the present invention.

FIG. 24 is a diagram for a screen of a display of a mobile terminal according to one embodiment of the present invention.

The mobile terminal 100 is in a state that a memo mode is activated while a first application is executing. FIG. 24 shows an example that the first application corresponds to a map application.

Referring to FIG. 24 (*a*), a trajectory 201 of a specific pattern, a recommended word 211 corresponding to a first GUI 210 selected by a user, and additional information 212 corresponding to a second GUI 220 selected by the user are displayed in the display 151. Since a displaying process of the recommended word 211 and the additional information 212 is mentioned earlier, explanation on the process is omitted.

The controller 180 controls the display 151 to display icons 410, which respectively correspond to at least one second application capable of interlocking with a specific keyword (e.g., 'appointment') included in the recommended word 211 which is displayed in the display 151. The icons can be displayed in an inactivated state.

For instance, the icons 410 respectively corresponding to a calendar application, an alarm application, and a notepad application can be displayed in the display 151 as the second application capable of interlocking with the specific keyword such as 'appointment'.

The user input unit 130 receives a fourth touch input for selecting one of the icons 410.

As depicted in FIG. 24 (*b*), the controller 180 executes the second application corresponding to the icon 410 selected by the fourth touch input. FIG. 24 (*b*) shows an example that the second application corresponding to the selected icon 410 corresponds to a calendar application.

The controller 180 configures the executed second application using the additional information 212. For instance, the controller 180 can configure a schedule registration menu of the calendar application using the additional information 212 as appointment information and using a current date, time information and the like.

A screen of the display 151 depicted in FIG. 24 (*b*) is just an example. According to embodiment, a configuration screen itself of the second application may not be displayed in the display 151.

As depicted in FIG. 24 (*c*), the controller 180 controls the display 151 to display an icon 410*a* corresponding to the second application in which the configuration is completed in an active state. A user can recognize whether the second application is configured by a display state of the icon 410 changing from the inactive state to the active state.

Besides the navigation application, the map application, and the calendar application, a user can add a different application by selecting an interlocking app add menu 420.

Although FIG. 24 (*a*) explains an example that the trajectory 201 of the specific pattern, the recommended word 211 corresponding to the first GUI 210 selected by the user, and the additional information 212 corresponding to the second GUI 220 selected by the user are displayed in the display 151, it is apparent that the present embodiment can also be applied to a case that the trajectory 201 of the specific pattern and the recommended word 211 are displayed in the display 151 only without the additional information 212. In this case, the controller 180 can configure the executed second application using information corresponding to a position on the display 151 in which the trajectory 201 of the specific pattern is displayed among information associated with the first application.

Figure 25:
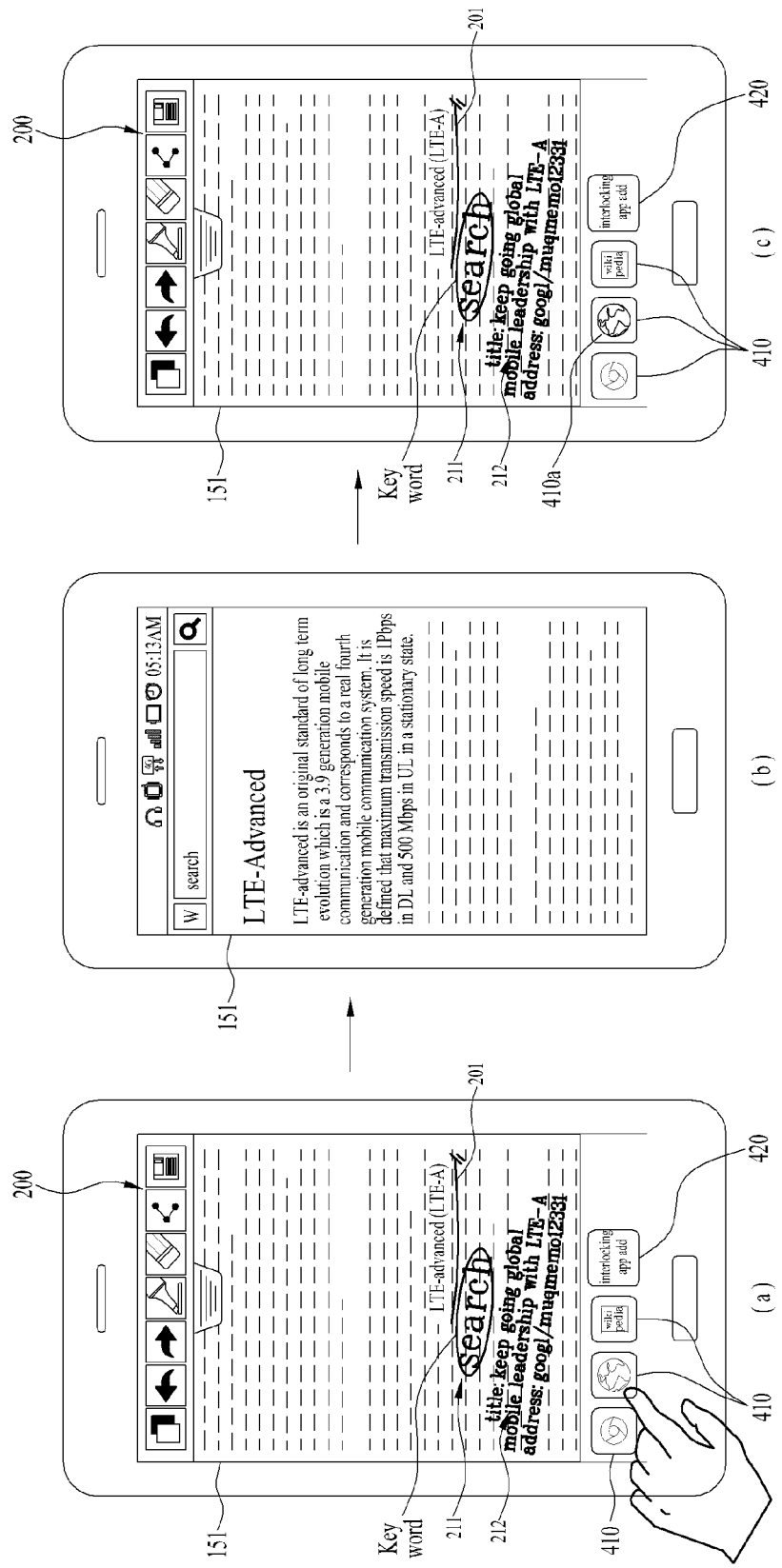
FIG. 25 is a diagram for a screen of a display of a mobile terminal according to one embodiment of the present invention.

FIG. 25 is a diagram for a screen of a display of a mobile terminal according to one embodiment of the present invention.

The mobile terminal 100 is in a state that a memo mode is activated while a first application is executing. FIG. 25 shows an example that the first application corresponds to a web service application.

Referring to FIG. 25 (*a*), a trajectory 201 of a specific pattern, a recommended word 211 corresponding to a first GUI 210 selected by a user, and additional information 212 corresponding to a second GUI 220 selected by the user are displayed in the display 151. Since a displaying process of the recommended word 211 and the additional information 212 is mentioned earlier, explanation on the process is omitted.

The controller 180 controls the display 151 to display icons 410, which respectively correspond to at least one second application capable of interlocking with a specific keyword (e.g., 'search') included in the recommended word 211 which is displayed in the display 151. The icons can be displayed in an inactivated state.

For instance, the icons 410 respectively corresponding to three web service applications associated with a search engine can be displayed in the display 151 as the second application capable of interlocking with the specific keyword such as 'search'.

The user input unit 130 receives a fourth touch input for selecting one of the icons 410.

As depicted in FIG. 25 (*b*), the controller 180 executes the second application corresponding to the icon 410 selected by the fourth touch input.

The controller 180 configures the executed second application using information on a screen of the display in which the trajectory 201 of the specific pattern is displayed, the recommended word 111, the additional information 112, or the like. For instance, the controller 180 can configure the second application to search for 'LTE advanced' which is the information on the screen of the display in which the trajectory 201 of the specific pattern is displayed.

The screen of the display 151 depicted in FIG. 25 (*b*) is just an example. According to embodiment, a configuration screen itself of the second application may not be displayed in the display 151.

As depicted in FIG. 25 (*c*), the controller 180 controls the display 151 to display an icon 410*a* corresponding to the second application in which the configuration is completed in an active state. A user can recognize whether the second application is configured by a display state of the icon 410 changing from the inactive state to the active state.

Besides the navigation application, the map application, and the calendar application, a user can add a different application by selecting an interlocking app add menu 420.

Meanwhile, according to the present invention, it may recommend an application capable of being interlocked with a specific pattern. Regarding this, it shall be described with reference to FIG. 26 to FIG. 30.

Figure 26:
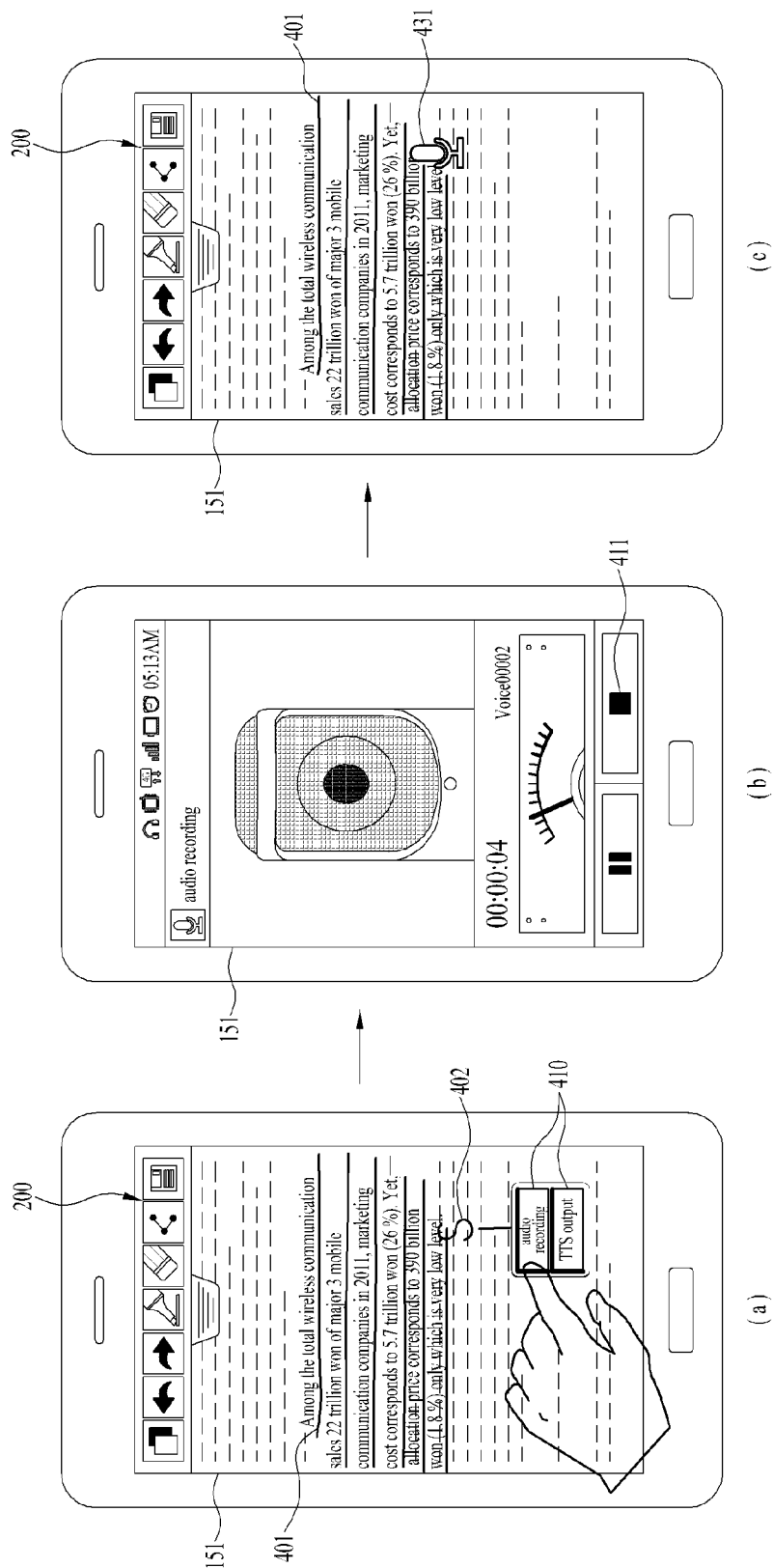
FIG. 26 is a diagram for a screen of a display of a mobile terminal according to one embodiment of the present invention.

FIG. 26 is a diagram for a screen of a display of a mobile terminal according to one embodiment of the present invention.

The mobile terminal 100 is in a state that a memo mode is activated while a first application is executing. FIG. 26 shows an example that the first application corresponds to a web service application.

As depicted in FIG. 26 (a), the user input unit 130 receives a fifth touch input corresponding to a part of an execution screen of the first application in the memo mode. Assume that the fifth touch input includes a first specific pattern and the first specific pattern corresponds to the part of the execution screen of the first application.

The controller 180 displays a trajectory 401 of the first specific pattern via the display 151.

The user input unit 130 receives a sixth touch input of a second specific pattern. The controller 180 displays a trajectory 402 of the second specific pattern via the display 151.

The controller 180 controls the display 151 to display third GUIs 410, which correspond to at least one third application capable of being interlocked with the second specific pattern. The memory 160 stores mapping data between a specific pattern and an application.

As an example, the controller 180 can display the third GUI 410 corresponding to 'audio recording application' and the third GUI 410 corresponding to 'TTS (text to speech) application' via the display 151 as the third application capable of interlocking with an S pattern. For instance, if the S pattern is inputted, the controller 180 can recognize it as a user intends to use an audio recording function or a TTS function in the memo mode.

The user input unit 130 receives a seventh touch input for selecting one of the third GUIs 410.

As depicted in FIG. 26 (b), if the seventh touch input is detected, the controller 180 executes a third application corresponding to the selected third GUI 410.

For instance, if the seventh touch input for selecting the third GUI 410, which corresponds to 'audio recording application', is detected, the controller 180 performs audio recording by executing the audio recording application.

If a user selects a stop menu 411, the audio recording is stopped and it may return to the execution screen of the first application as depicted in FIG. 26 (c).

The controller 180 controls the display 151 to display an indicator 431 indicating an execution result of the second application (audio recording application). In this case, the trajectory 401 of the first pattern and the indicator 431 are displayed together in one screen of the display 151 and may be displayed in the execution screen of the first application in a manner of being overlaid.

If a user touches the indicator 431, audio data of the recording can be outputted via the audio output module 152.

Figure 27:
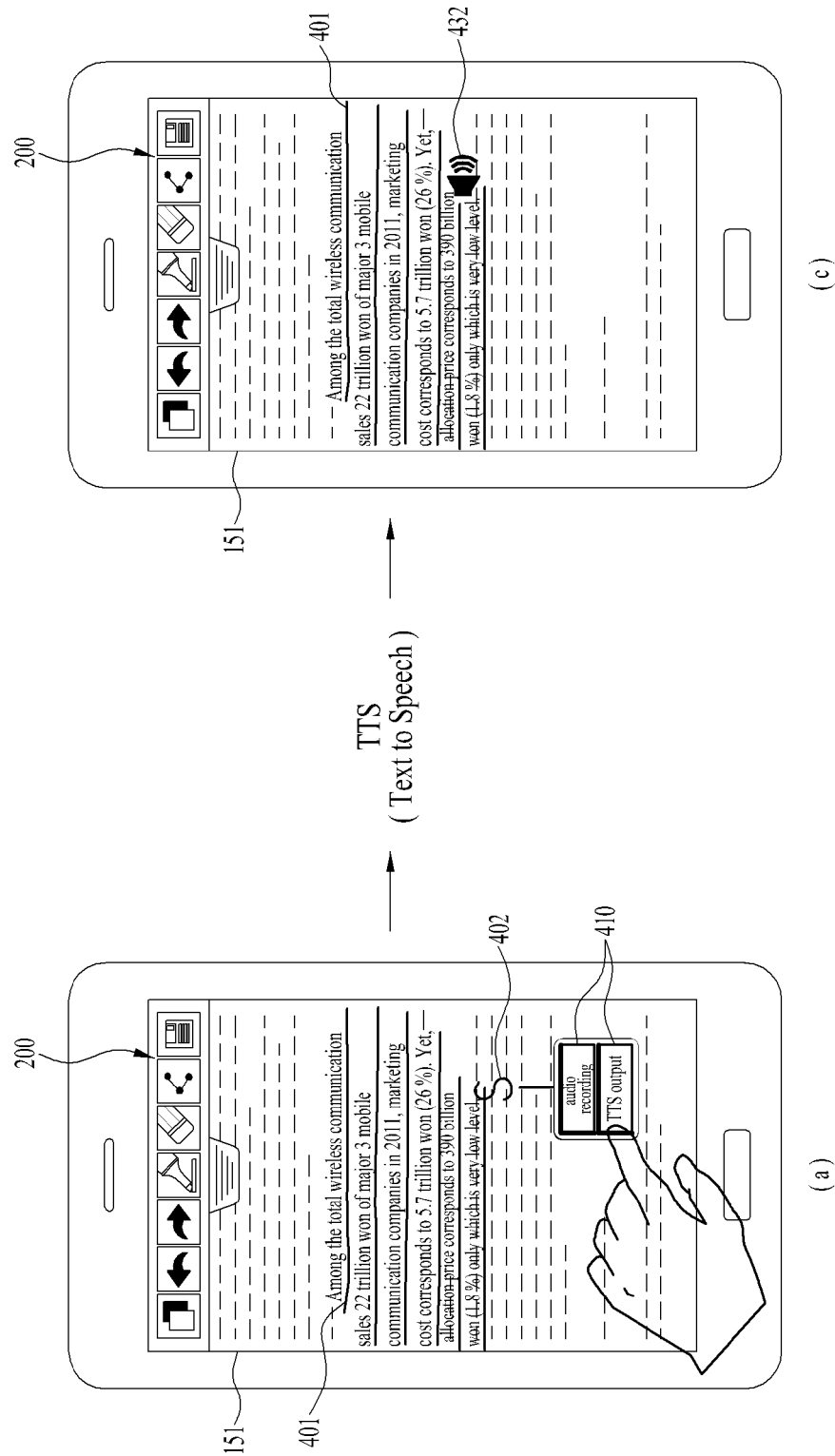
FIG. 27 is a diagram for a screen of a display of a mobile terminal according to one embodiment of the present invention.

FIG. 27 is a diagram for a screen of a display of a mobile terminal according to one embodiment of the present invention.

The mobile terminal 100 is in a state that a memo mode is activated while a first application is executing. FIG. 27 shows an example that the first application corresponds to a web service application.

As depicted in FIG. 27 (a), the user input unit 130 receives a fifth touch input corresponding to a part of an execution screen of the first application in the memo mode. Assume that the fifth touch input includes a first specific pattern and the first specific pattern corresponds to the part of the execution screen of the first application.

The controller 180 displays a trajectory 401 of the first specific pattern via the display 151.

The user input unit 130 receives a sixth touch input of a second specific pattern. The controller 180 displays a trajectory 402 of the second specific pattern via the display 151.

The controller 180 controls the display 151 to display third GUIs 410, which correspond to at least one third application capable of being interlocked with the second specific pattern.

As an example, the controller 180 can display the third GUI 410 corresponding to 'audio recording application' and the third GUI 410 corresponding to 'TTS (text to speech) application' via the display 151 as the third application capable of interlocking with an S pattern. For instance, if the S pattern is inputted, the controller 180 can recognize it as a user intends to use an audio recording function or a TTS function in the memo mode.

The user input unit 130 receives a seventh touch input for selecting one of the third GUIs 410.

If the seventh touch input is detected, the controller 180 executes a third application corresponding to the selected third GUI 410.

For instance, if the seventh touch input for selecting the third GUI 410, which corresponds to 'TTS application', is detected, the controller 180 converts text data corresponding to the part of the first specific pattern to audio data by executing a TTS application. Since a TTS technology for converting a text to audio is a widely known technology in a technical field to which the present invention belongs, detailed explanation on the technology is omitted.

If the job for converting the text data corresponding to the part of the first specific pattern to the audio data is completed, it may return to an execution screen of the first application as depicted in FIG. 27 (b).

The controller 180 controls the display 151 to display an indicator 432 indicating an execution result of the second application (TTS application). In this case, the trajectory 401 of the first pattern and the indicator 432 are displayed together in one screen of the display 151 and may be displayed in the execution screen of the first application in a manner of being overlaid.

If a user touches the indicator 432, audio data generated by the TTS conversion can be outputted via the audio output module 152.

Figure 28:
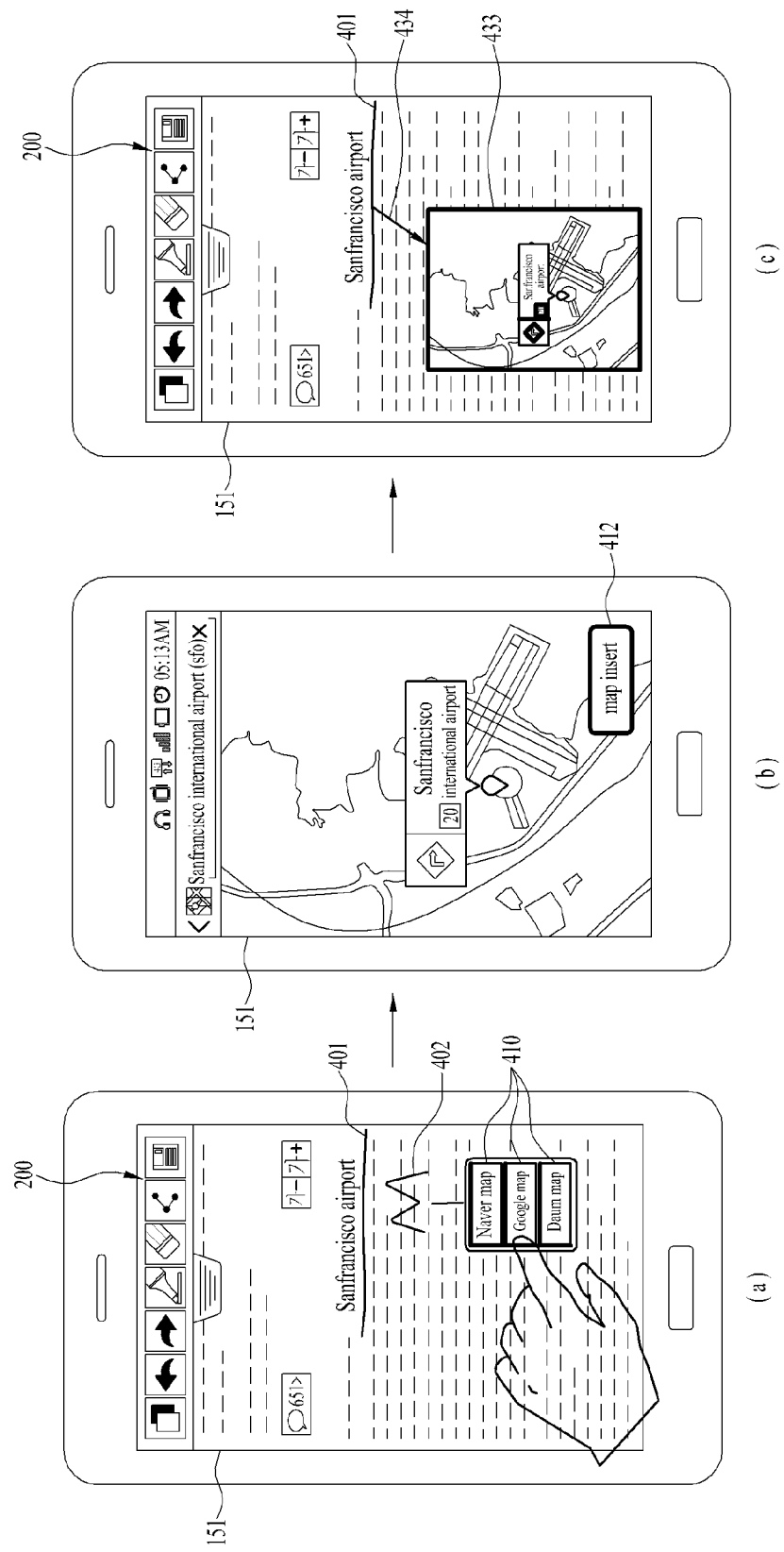
FIG. 28 is a diagram for a screen of a display of a mobile terminal according to one embodiment of the present invention.

FIG. 28 is a diagram for a screen of a display of a mobile terminal according to one embodiment of the present invention.

The mobile terminal 100 is in a state that a memo mode is activated while a first application is executing. FIG. 28 shows an example that the first application corresponds to a web service application.

As depicted in FIG. 28 (a), the user input unit 130 receives a fifth touch input corresponding to a part of an execution screen of the first application in the memo mode. Assume that the fifth touch input includes a first specific pattern and the first specific pattern corresponds to the part of the execution screen of the first application.

The controller 180 displays a trajectory 401 of the first specific pattern via the display 151.

The user input unit 130 receives a sixth touch input of a second specific pattern. The controller 180 displays a trajectory 402 of the second specific pattern via the display 151.

The controller 180 controls the display 151 to display third GUIs 410, which correspond to at least one third application capable of being interlocked with the second specific pattern.

As an example, the controller 180 can display the third GUI 410 corresponding to 'Naver map application', the third GUI 410 corresponding to 'Google map application' and the third GUI 410 corresponding to 'Daum map application' via the display 151 as the third application capable of interlocking with an M pattern. For instance, if the M pattern is inputted, the controller 180 can recognize it as a user intends to add a map search screen to a memo.

The user input unit 130 receives a seventh touch input for selecting one of the third GUIs 410.

As depicted in FIG. 28 (*b*), if the seventh touch input is detected, the controller 180 executes a third application corresponding to the selected third GUI 410.

For instance, if the seventh touch input for selecting the third GUI 410, which corresponds to 'Google map application', is detected, the controller 180 performs a map search using a part of text data corresponding to the first specific pattern by executing the Google map application.

As depicted in FIG. 28 (*c*), if a user selects a map insert menu 412, it may return to an execution screen of the first application.

The controller 180 controls the display 151 to display an indicator 432 indicating an execution result of the second application (Google map application). In this case, an arrow 434 can be displayed between the indicator 433 and the trajectory 401 of the first specific pattern to make a user clearly recognize that the indicator 433 is associated with the trajectory 401 of the first specific pattern.

The trajectory 401 of the first pattern and the indicator 433 are displayed together in one screen of the display 151 and may be displayed in the execution screen of the first application in a manner of being overlaid.

According to embodiment, if a user touches the indicator 433, as depicted in FIG. 28 (*b*), an execution screen of the second application may be displayed in the display 151.

Figure 29:
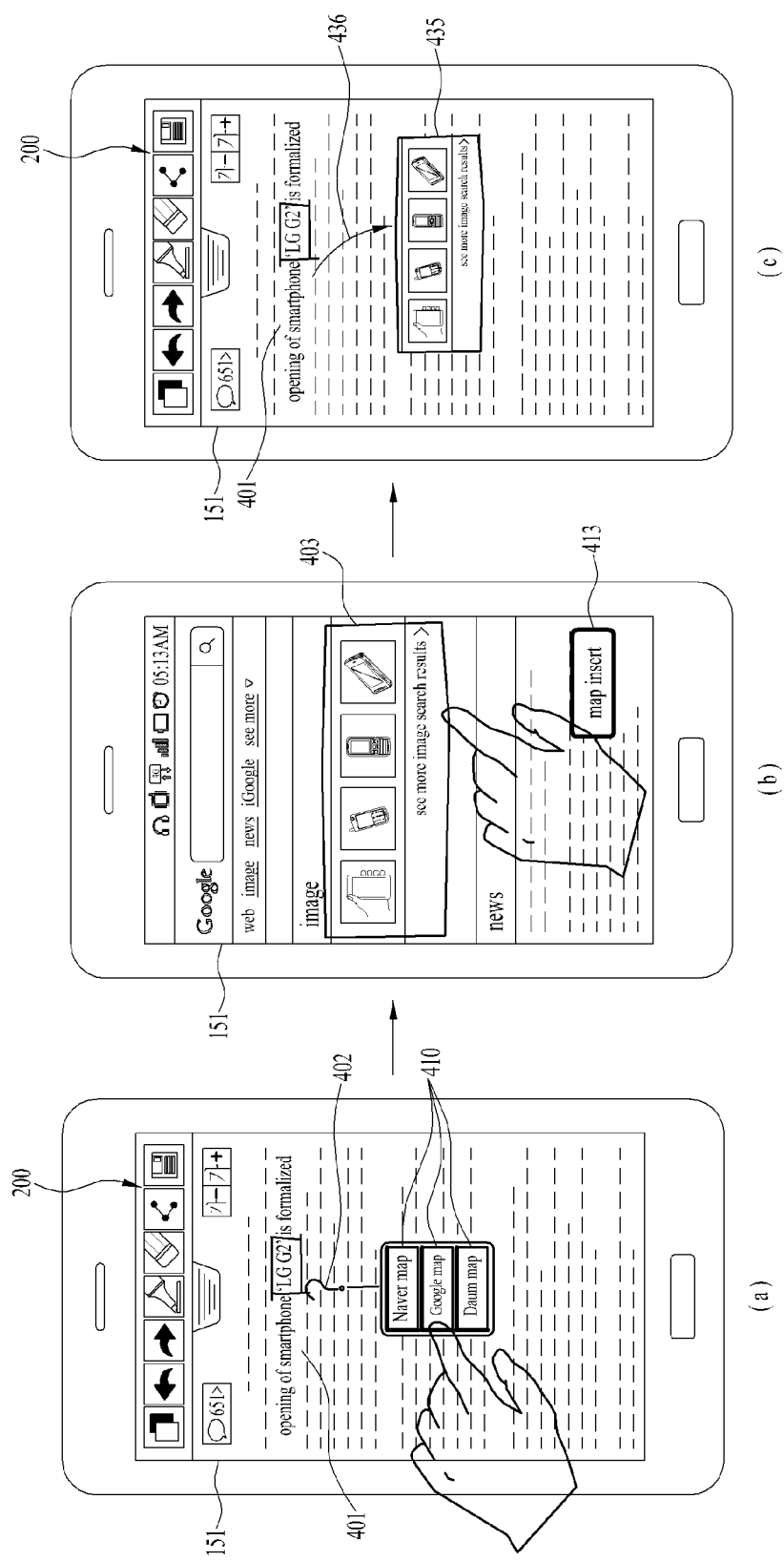
FIG. 29 is a diagram for a screen of a display of a mobile terminal according to one embodiment of the present invention.

FIG. 29 is a diagram for a screen of a display of a mobile terminal according to one embodiment of the present invention.

The mobile terminal 100 is in a state that a memo mode is activated while a first application is executing. FIG. 29 shows an example that the first application corresponds to a web service application.

As depicted in FIG. 29 (*a*), the user input unit 130 receives a fifth touch input corresponding to a part of an execution screen of the first application in the memo mode. Assume that the fifth touch input includes a first specific pattern and the first specific pattern corresponds to the part of the execution screen of the first application.

The controller 180 displays a trajectory 401 of the first specific pattern via the display 151.

The user input unit 130 receives a sixth touch input of a second specific pattern. The controller 180 displays a trajectory 402 of the second specific pattern via the display 151.

The controller 180 controls the display 151 to display third GUIs 410, which correspond to at least one third application capable of being interlocked with the second specific pattern.

As an example, the controller 180 can display the third GUI 410 corresponding to 'Naver search application', the third GUI 410 corresponding to 'Google search application' and the third GUI 410 corresponding to 'Daum search application' via the display 151 as the third application capable of interlocking with a question mark pattern. The Naver search application, the Google search application, and the Daum search application correspond to search web browsers belong to the web service application. For instance, if the question mark pattern is inputted, the controller 180 can recognize it as a user intends to add a search result to a memo.

The user input unit 130 receives a seventh touch input for selecting one of the third GUIs 410.

As depicted in FIG. 29 (*b*), if the seventh touch input is detected, the controller 180 executes a third application corresponding to the selected third GUI 410.

For instance, if the seventh touch input for selecting the third GUI 410, which corresponds to 'Google search application', is detected, the controller 180 performs a search using a part of text data corresponding to the first specific pattern by executing the Google search application.

The user input unit 130 receives a touch input for selecting a preferred part in an execution screen of the Google search application depicted in FIG. 29 (*b*). The controller 180 displays a trajectory 403, which corresponds to the touch input for selecting the preferred part, via the display 151.

As depicted in FIG. 29 (*c*), if a user selects a search insert menu 413, it may return to an execution screen of the first application.

The controller 180 controls the display 151 to display an indicator 435 indicating an execution result of the second application (Google search application). The indicator 435 may correspond to an image corresponding to a part selected by the touch input for selecting the preferred part in the execution screen of the Google search application depicted in FIG. 29 (*b*). In this case, an arrow 436 can be displayed between the indicator 435 and the trajectory 401 of the first specific pattern to make a user clearly recognize that the indicator 435 is associated with the trajectory 401 of the first specific pattern.

The trajectory 401 of the first pattern and the indicator 435 are displayed together in one screen of the display 151 and may be displayed in the execution screen of the first application in a manner of being overlaid.

According to the present embodiment, a user selects a preferred part from the execution screen of the second application only and may be able to add the preferred part to a memo.

Figure 30:
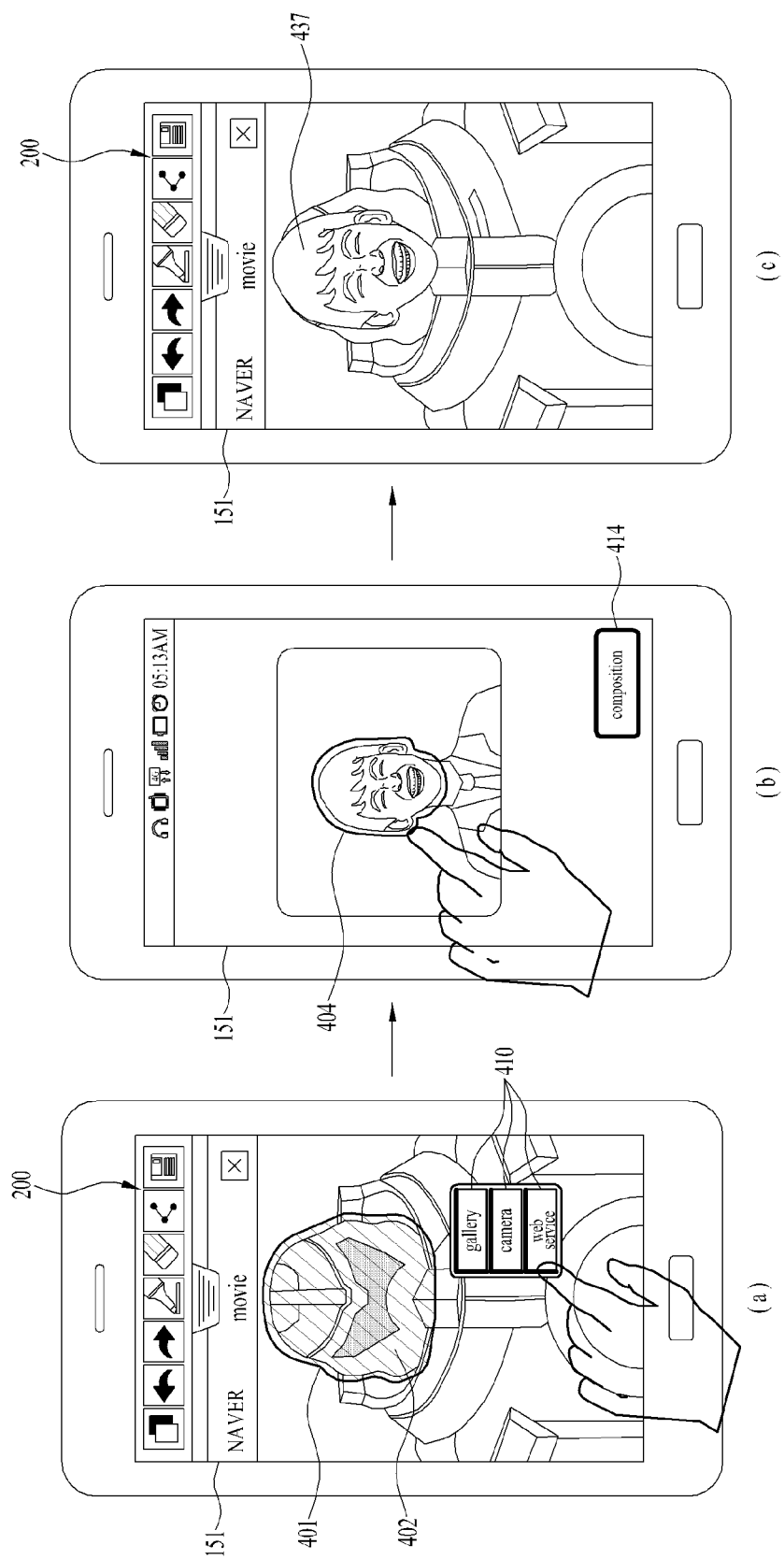
FIG. 30 is a diagram for a screen of a display of a mobile terminal according to one embodiment of the present invention.

FIG. 30 is a diagram for a screen of a display of a mobile terminal according to one embodiment of the present invention.

The mobile terminal 100 is in a state that a memo mode is activated while a first application is executing. FIG. 30 shows an example that the first application corresponds to a web service application.

As depicted in FIG. 30 (*a*), the user input unit 130 receives a fifth touch input corresponding to a part of an execution screen of the first application in the memo mode. Assume that the fifth touch input includes a first specific pattern and the first specific pattern corresponds to the part of the execution screen of the first application.

The controller 180 displays a trajectory 401 of the first specific pattern via the display 151.

The user input unit 130 receives a sixth touch input of a second specific pattern. The controller 180 displays a trajectory 402 of the second specific pattern via the display 151.

The controller 180 controls the display 151 to display third GUIs 410, which correspond to at least one third application capable of being interlocked with the second specific pattern.

As an example, the controller 180 can display the third GUI 410 corresponding to 'gallery application', the third GUI 410 corresponding to 'camera application' and the third GUI 410 corresponding to 'web service application' via the display 151 as the third application capable of interlocking with a deviant crease line pattern. For instance, if the deviant crease line pattern is inputted, the controller 180 can recognize it as a user intends to put a random picture or a part of the random picture and an execution screen of the first application together in the memo mode.

The user input unit 130 receives a seventh touch input for selecting one of the third GUIs 410.

If the seventh touch input is detected, the controller 180 executes a third application corresponding to the selected third GUI 410.

For instance, if the seventh touch input for selecting the third GUI 410, which corresponds to 'web service application', is detected, the controller 180 executes a web service application. If the web service application is executed, a user can perform a search by inputting a preferred word or a sentence to a search window.

FIG. 30 (b) shows a result of searching for a random picture searched by a user via the web service application.

The user input unit 130 receives a touch input for selecting a preferred part in an execution screen of the web service application as depicted in FIG. 30 (b). The controller 180 displays a trajectory 404, which corresponds to the touch input for selecting the preferred part, via the display 151.

As depicted in FIG. 30 (c), if a user selects a composition menu 414, it may return to an execution screen of the first application.

The controller 180 controls the display 151 to display the execution screen of the first application where a part corresponding to the trajectory 404 among the execution screen of the web service application depicted in FIG. 30 (b) and a part corresponding to the trajectory of the deviant crease line pattern among the execution screen of the first application depicted in FIG. 30 (a) are put together.

In this case, the controller 180 may control the display 151 to display an indicator 437 indicating a composite part as a result of executing the second application (web service application).

Meanwhile, according to the present embodiment, a visual effect can be provided to emphasize a part corresponding to a specific pattern. Regarding this, it shall be explained with reference to FIG. 31 and FIG. 32.

Figure 31:
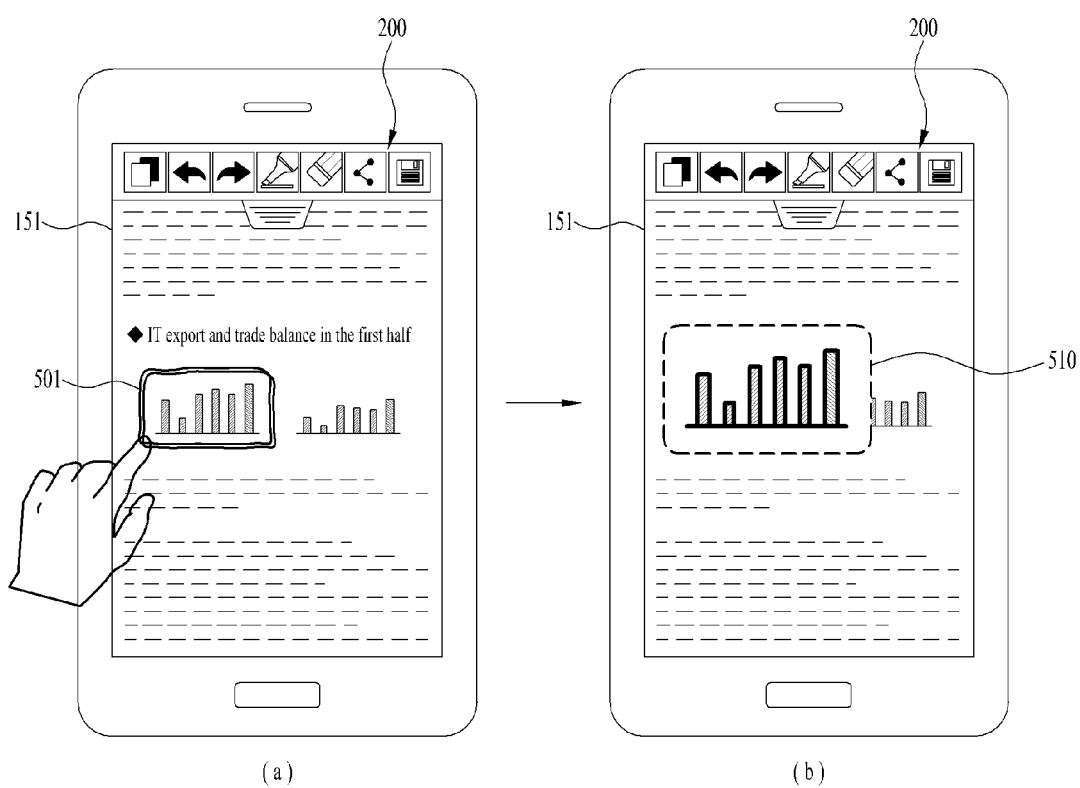
FIG. 31 is a diagram for a screen of a display of a mobile terminal according to one embodiment of the present invention.

FIG. 31 is a diagram for a screen of a display of a mobile terminal according to one embodiment of the present invention.

The mobile terminal 100 is in a state that a memo mode is activated while a first application is executing. FIG. 31 shows an example that the first application corresponds to a web service application.

As depicted in FIG. 31 (a), the user input unit 130 receives an eighth touch input corresponding to a part of an execution screen of the first application in the memo mode. The controller 180 displays a trajectory 501 corresponding to a pattern inputted by the eighth touch input.

As depicted in FIG. 31 (b), if the eighth touch input is detected, the controller 180 controls the display 151 to display a part 510 corresponding to the trajectory 501 in a manner of expanding the part.

According to embodiment, a user can repeatedly draw a prescribed pattern corresponding to the eighth touch input, which corresponds to a part of the execution screen of the first application. The controller 180 can control the display 151 to display the part 510 corresponding to the trajectory 501 in a manner of gradually expanding the part whenever the eighth touch input is detected.

According to the present embodiment, a user can display a preferred part among the execution screen of the first application in a manner of emphasizing the preferred part.

Figure 32:
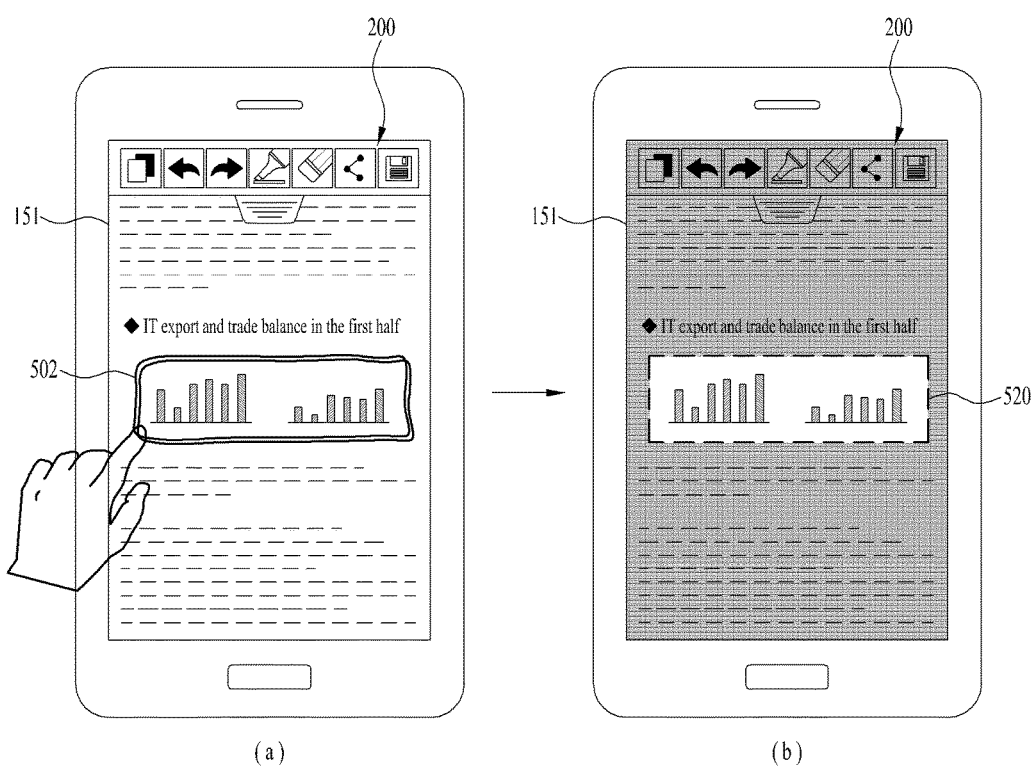
FIG. 32 is a diagram for a screen of a display of a mobile terminal according to one embodiment of the present invention.

FIG. 32 is a diagram for a screen of a display of a mobile terminal according to one embodiment of the present invention.

The mobile terminal 100 is in a state that a memo mode is activated while a first application is executing. FIG. 32 shows an example that the first application corresponds to a web service application.

As depicted in FIG. 32 (a), the user input unit 130 receives a ninth touch input corresponding to a part of an execution screen of the first application in the memo mode. The controller 180 displays a trajectory 502 corresponding to a pattern inputted by the ninth touch input.

As depicted in FIG. 32 (b), if the ninth touch input is detected, the controller 180 controls the display 151 to dimly display the execution screen of the first application except a part 520 corresponding to the trajectory 501.

According to embodiment, a user can repeatedly draw a prescribed pattern corresponding to the ninth touch input, which corresponds to a part of the execution screen of the first application. The controller 180 can control the display 151 to gradually dimly display the execution screen of the first application except the part 520 corresponding to the trajectory 501 whenever the ninth touch input is detected.

According to the present embodiment, a user can display a preferred part among the execution screen of the first application in a manner of emphasizing the preferred part.

Meanwhile, according to the present invention, memos including an identical pattern can be managed in a manner of being collected in one place. Regarding this, it shall be explained with reference to FIG. 33.

Figure 33:
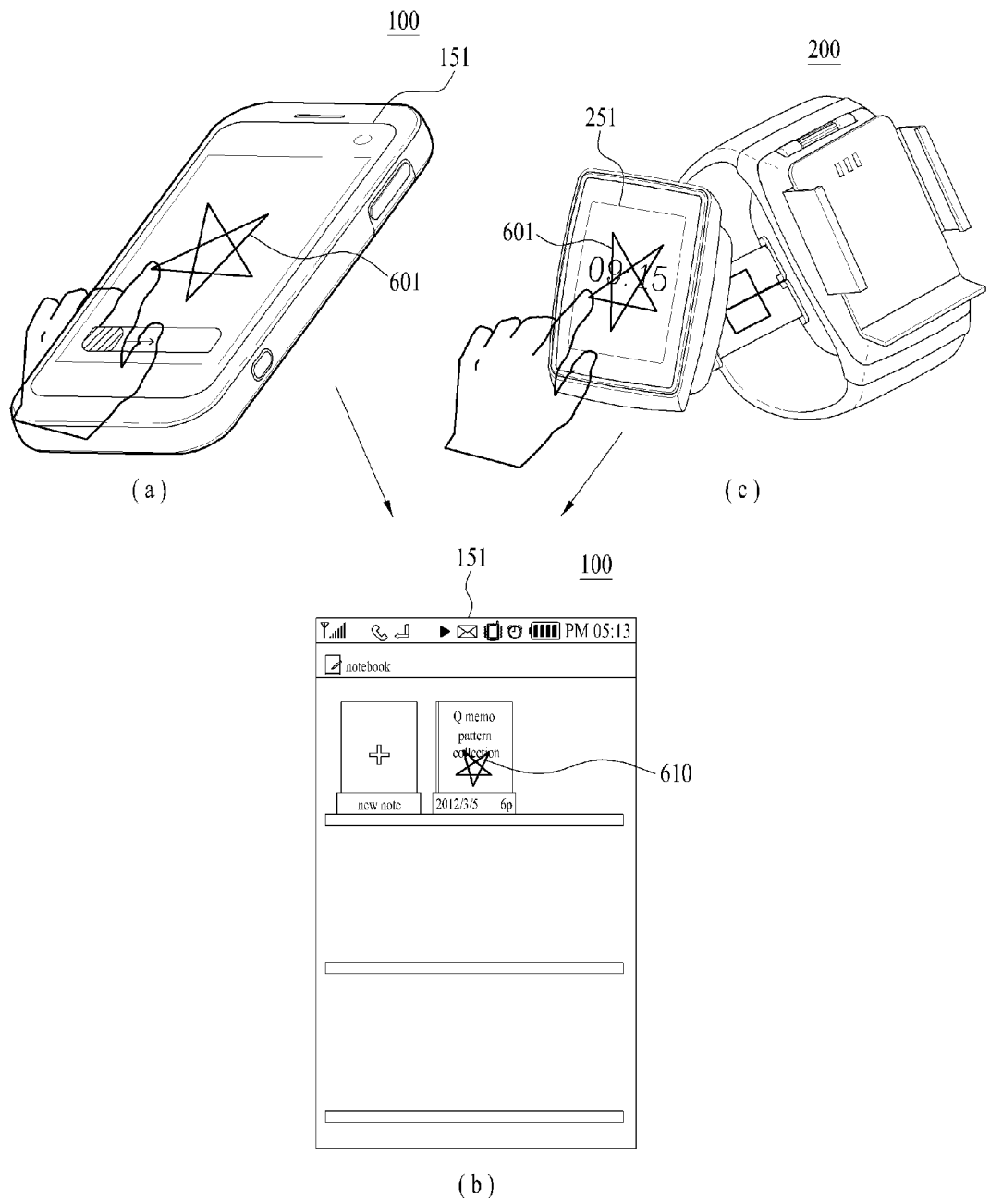
FIG. 33 is a diagram for explaining an example of a method of managing memos according to a pattern in a mobile terminal according to one embodiment of the present invention.

FIG. 33 is a diagram for explaining an example of a method of managing memos according to a pattern in a mobile terminal according to one embodiment of the present invention.

As depicted in FIG. 33 (a), the user input unit 130 receives a touch input of a specific pattern 601 in a state that a specific screen is displayed in the display 151. In order to distinguish this from a case that the specific pattern 601 is inputted in an environment of a normal use, FIG. 33 (a) shows an example that the touch input of the specific pattern 601 is received when a lock screen is displayed in the display 151.

As depicted in FIG. 33 (b), the controller 180 controls the display 151 to display a collection folder 610 of memos including the specific pattern 601. If a user selects the collection folder 610, the user can check the memos in which the specific pattern is included among memos stored so far.

Referring to FIG. 33 (c), a wearable device 200, which is paired with the mobile terminal 100 of the present invention, is shown in the drawing. As an example of the wearable device 200, a smart watch is shown in FIG. 33. In the same manner, as depicted in FIG. 33 (c), if the user inputs the specific pattern 601 in a display 251 of the wearable device 200 in a state that a specific screen is displayed in the display 251 of the wearable device 200, the collection folder 610 of the memos including the specific pattern 601 can be displayed in the display 151 of the mobile terminal 100 which is paired with the wearable device 200.

According to the present embodiment, if a pattern is made for such a specific purpose as traveling preparation, learning, or the like and if a memo is made and stored to make the pattern to be included in the memo, it will be more convenient to manage or check the memo in one place.

Meanwhile, according to the present invention, if an additional pattern is inputted using a pattern interlocking menu, it may manage memos interlocked with the additional pattern as a group in a manner of collecting the memos in the group. Regarding this, it shall be described with reference to FIG. 34.

Figure 34:
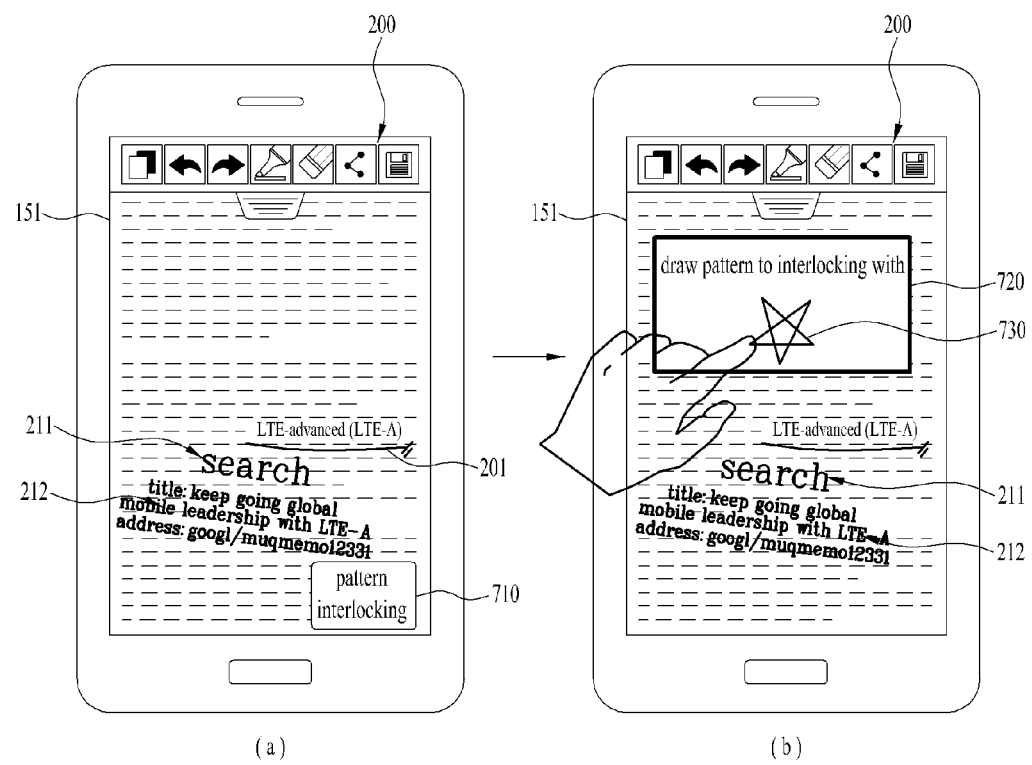
FIG. 34 is a diagram for explaining an example of a method of managing memos interlocked with an additional pattern in one group in a mobile terminal according to one embodiment of the present invention.

FIG. 34 is a diagram for explaining an example of a method of managing memos interlocked with an additional pattern in one group in a mobile terminal according to one embodiment of the present invention.

The mobile terminal 100 is in a state that a memo mode is activated while a first application is executing. FIG. 34 shows an example that the first application corresponds to a web service application.

A memo including a trajectory 201 of a specific pattern, a recommended word 211, and additional information 212 is displayed in the display 151 of the mobile terminal 100. And, a pattern interlocking menu 710 is displayed in the display 151 of the mobile terminal 100.

As depicted in FIG. 34 (b), if a user selects the pattern interlocking menu 710, a GUI 720 for receiving a touch input corresponding to a specific pattern 730 can be displayed in the display 151. In this case, unlike a specific pattern for recommending the recommended word 211, the specific pattern 730 indicates a pattern for interlocking a plurality of memos.

If the user inputs the specific pattern 730 via the GUI 720, the inputted specific pattern 730 and a memo depicted in FIG. 34 (a) are interlocked with each other and the memo depicted in FIG. 34 (a) is automatically included in a group of memos corresponding to the specific pattern 730. Hence, the user can check a plurality of the memos interlocked with the specific pattern 730 at once in the future via the group of the memos corresponding to the specific pattern 730.

According to the present embodiment, memos, which are made for such a specific purpose as traveling preparation, learning, or the like, can be managed in a manner of being interlocked with an identical specific pattern.

Effects obtainable by using a mobile terminal and a method of controlling therefor according to the present invention are described in the following.

According to one embodiment of the present invention, since a recommended word corresponding to a specific pattern is displayed in the mobile terminal and a memo is automatically completed when a user selects a preferred recommended word, user convenience is enhanced.

According to one embodiment of the present invention, since a memo is automatically completed in the mobile terminal in a manner of adding additional information to a recommended word selected by a user, user convenience is enhanced.

According to one embodiment of the present invention, a solution for automatically setting an application is provided to the mobile terminal using information included in the memo.

Effects obtainable from the present invention may be non-limited by the above mentioned effect. And, other unmentioned effects can be clearly understood from the following description by those having ordinary skill in the technical field to which the present invention pertains.

It will be apparent to those skilled in the art that the present invention can be specified into other form(s) without departing from the spirit or scope of the inventions.

The above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a mobile terminal, comprising:
   storing a database in a memory comprising one or more specific patterns, wherein each specific pattern is stored to be associated with a plurality of groups of recommended words, wherein each group is associated with a type of application to be executed at the mobile terminal;
   activating a memo mode while displaying a screen of a first application;
   displaying a first touch pattern in response to a first pattern input comprising the first pattern;
   retrieving a stored plurality of groups of recommended words associated with the first touch pattern;
   determining a specific group of the retrieved plurality of stored groups associated with the first application;
   displaying a plurality of primary content items associated with the first touch pattern, wherein the primary content items correspond to the determined specific group of recommended words associated with the first application; and
   displaying content associated with a selected primary content item of the plurality of primary content items wherein the content is displayed together with the displayed first pattern to indicate an association between the displayed content and the displayed first pattern in response to an input selecting the selected primary content item,
   wherein the plurality of primary content items associated with the first touch pattern are changed based on the specific group of the retrieved plurality of stored groups associated with the first application, and
   wherein the retrieved stored plurality of groups of recommended words associated with the first touch pattern includes the determined group and further includes a second group of recommended words different from the determined group and associated with a second application, wherein the determined group and the second group are both stored to be associated with the first touch pattern.

2. The method of claim 1, further comprising identifying first application content of the first application selected by the first pattern input, wherein the displayed content associated with the primary content item comprises information related to the first application content.

3. The method of claim 2, further comprising:
   displaying a plurality of icons respectively corresponding to a plurality of second applications each capable of executing a corresponding operation using the first application content;
   executing a second application corresponding to a selected icon, wherein the selected icon is selected from among the displayed plurality of icons in response to an application selection input; and
   setting the executed second application to execute the corresponding operation using the first application content.

4. The method of claim 1, further comprising changing a size or an alignment of the displayed content in response to an adjustment input.

5. The method of claim 1, wherein the displayed content comprises a plurality of secondary content items respectively corresponding to additional content.

6. The method of claim 5, further comprising displaying content associated with a selected secondary content item, wherein the selected secondary content item is selected from among the displayed plurality of secondary content items in response to a secondary selection input, and wherein the displaying of the content associated with the secondary content item is at a position proximate to the displayed first pattern.

7. The method of claim 6, further comprising identifying first application content of the first application selected by the first pattern input, wherein the displayed content associated with the secondary content item comprises information related to the first application content.

8. The method of claim 7, wherein:
the first application corresponds to a map application or a personal contact application; and
the information related to the first application content comprises at least:
an address of a location displayed on a map;
a name of a business located near the location;
a bus stop identifier located near the location;
a subway stop identifier located near the location;
an address of a contact displayed on a personal contact screen;
a telephone number of the contact; or
an e-mail address of the contact.

9. The method of claim 5, further comprising:
identifying first application content of the displayed application selected by the first pattern input;
displaying a plurality of icons respectively corresponding to a plurality of second applications each capable of executing a corresponding operation using the first application content;
executing a second application corresponding to a selected icon, wherein the selected icon is selected from among the displayed plurality of icons in response to an application selection input; and
setting the executed second application to execute the corresponding operation using the first application content.

10. A mobile terminal comprising:
a memory configured to store a database in a memory comprising one or more specific patterns, wherein each specific pattern is stored to be associated with a plurality of groups of recommended words, wherein each group is associated with a type of application to be executed at the mobile terminal;
a touchscreen; and
a hardware controller configured to:
activating a memo mode of the mobile terminal while a screen of a first application is displayed on the touchscreen;
cause the touchscreen to display a first pattern on the screen of the first application in response to a first pattern input comprising the first pattern;
retrieve a stored plurality of groups of recommended words associated with the first touch pattern;
determine a specific group of the retrieved plurality of stored groups associated with the first application;
cause the touchscreen to display a plurality of primary content items associated with the first touch pattern, wherein the primary content items correspond to the determined specific group of recommended words associated with the first application; and
cause the touchscreen to display content associated with a selected primary content item of the plurality of primary content items wherein the content is displayed together with the displayed first pattern to indicate an association between the displayed content and the displayed first pattern in response to an input selecting the selected primary content item,
wherein the plurality of primary content items associated with the first touch pattern are changed based on the specific group of the retrieved plurality of stored groups associated with the first application, and
wherein the retrieved stored plurality of groups of recommended words associated with the first touch pattern includes the determined group and further includes a second group of recommended words different from the determined group and associated with a second application, wherein the determined group and the second group are both stored to be associated with the first touch pattern.

11. The mobile terminal of claim 10, wherein the controller is further configured to identify first application content of the first application selected by the first pattern input, wherein the displayed content associated with the primary content item comprises information related to the first application content.

12. The mobile terminal of claim 10, wherein the displayed content comprises a plurality of secondary content items respectively corresponding to additional content, and the controller is further configured to:
cause the touchscreen to display content associated with a selected secondary content item, wherein selected secondary content item is selected from among the displayed plurality of secondary content items in response to a secondary selection input.

13. The mobile terminal of claim 12, wherein the controller is further configured to identify first application content of the first application selected by the first pattern input, wherein the displayed content associated with the secondary content item comprises information related to the first application content.

14. The mobile terminal of claim 10, wherein the controller is further configured to:
identify first application content of the first application selected by the first pattern input;
cause the touchscreen to display a plurality of icons respectively corresponding to a plurality of second applications each capable of executing a corresponding operation using the first application content;
execute a second application corresponding to a selected icon, wherein the selected icon is selected from among the plurality of icons in response to an application selection input; and
set the second application to execute the corresponding operation using the first application content.

15. The mobile terminal of claim 14, wherein the plurality of second applications comprises at least:
an audio recording application;
a text-to-speech (TTS) application;
a map application;
a web search application;
a gallery application; or
a camera application.

16. The method of claim 1, further comprising:
receiving a second pattern input while the plurality of content items are displayed;

storing a new word associated with the received second pattern input to be associated with the first touch pattern; and displaying the new word as a displayed content item of the plurality of content items.

17. The mobile terminal of claim 10, wherein the controller is further configured to:

receive a second pattern input while the plurality of content items are displayed;

cause the memory to store a new word associated with the received second pattern input to be associated with the first touch pattern; and cause the touchscreen to display the new word as a displayed item of the plurality of content items.

* * * * *